(12) United States Patent
Hirai et al.

(10) Patent No.: US 7,958,740 B2
(45) Date of Patent: Jun. 14, 2011

(54) VEHICULAR AIR-CONDITIONER

(75) Inventors: Shinichiro Hirai, Ichinomiya (JP);
Takuya Kataoka, Okazaki (JP)

(73) Assignee: Denso Corporation, Kariya (JP)

( * ) Notice: Subject to any disclaimer, the term of this patent is extended or adjusted under 35 U.S.C. 154(b) by 1028 days.

(21) Appl. No.: 11/444,272

(22) Filed: May 31, 2006

(65) Prior Publication Data

US 2006/0270333 A1    Nov. 30, 2006

(30) Foreign Application Priority Data

May 31, 2005   (JP) .................. 2005-159366
Apr. 7, 2006    (JP) .................. 2006-106039

(51) Int. Cl.
| F25D 21/00 | (2006.01) |
| F25D 21/06 | (2006.01) |
| F25D 17/04 | (2006.01) |
| F25B 49/00 | (2006.01) |
| F24F 3/14 | (2006.01) |
| F24F 11/00 | (2006.01) |
| F24F 6/00 | (2006.01) |
| G05D 22/02 | (2006.01) |
| G05D 21/00 | (2006.01) |
| B01F 3/02 | (2006.01) |

(52) U.S. Cl. ......... 62/150; 62/176.1; 62/176.2; 62/151; 236/44 A; 236/44 R; 165/223

(58) Field of Classification Search ............... 62/176.1, 62/176.2, 150, 151; 236/44 A, 44 R; 165/223
See application file for complete search history.

(56) References Cited

U.S. PATENT DOCUMENTS

| 4,408,660 A | * | 10/1983 | Sutoh et al. ............... 165/202 |
| 5,516,041 A | * | 5/1996 | Davis et al. ............... 236/49.3 |
| 6,112,807 A | * | 9/2000 | Dage ...................... 165/202 |
| 6,155,061 A | * | 12/2000 | Davis et al. ............... 62/176.6 |
| 6,311,505 B1 | * | 11/2001 | Takano et al. ............. 62/159 |
| 6,347,746 B1 | * | 2/2002 | Dage et al. ............... 236/44 C |
| 7,266,960 B2 | * | 9/2007 | Shah ...................... 62/176.6 |
| 7,337,622 B2 | * | 3/2008 | Wang et al. ............... 62/150 |

FOREIGN PATENT DOCUMENTS

| JP | 63-32018 | 3/1988 |
| JP | 05-338429 | 12/1993 |
| JP | 2000-142077 | 5/2000 |
| JP | 2003-175717 | 6/2003 |
| JP | 2004-196105 | 7/2004 |

OTHER PUBLICATIONS

Office Action dated Apr. 27, 2010 in Japanese Application No. 2006-106039 with English translation thereof.

* cited by examiner

*Primary Examiner* — Thomas E Denion
*Assistant Examiner* — Michael Carton
(74) *Attorney, Agent, or Firm* — Harness, Dickey & Pierce, PLC

(57) ABSTRACT

A vehicle air-conditioner provided with an inside air-conditioning unit introducing at least one of inside air and outside air, adjusting the state of the introduced air, and blowing it out into the vehicle compartment, where an air-conditioning electronic control device judges if window glass is liable to fog up based on a window glass surface relative humidity near the window glass in the compartment (degree of ease of fogging). When it is judged that the window glass is liable to fog up, the inside air-conditioning unit is controlled to prevent the window glass from fogging up in defrost control, while when it is judged that the window glass is resistant to fogging, the inside air-conditioning unit is controlled to introduce at least inside air into the compartment.

16 Claims, 17 Drawing Sheets

| DEFROST CONTROL | BLOWER LEVEL |
|---|---|
| CONTROL MODE 10 | AUTO BLOWER LEVEL |
| CONTROL MODE 20 | AUTO BLOWER LEVEL |
| CONTROL MODE 30 | AUTO BLOWER LEVEL+3 |
| CONTROL MODE 40 | AUTO BLOWER LEVEL+3 |
| CONTROL MODE 50 | AUTO BLOWER LEVEL+6 |
| CONTROL MODE 60 | AUTO BLOWER LEVEL+6 |
| CONTROL MODE 70 | AUTO BLOWER LEVEL+9 |
| CONTROL MODE 80 | AUTO BLOWER LEVEL+12 |
| CONTROL MODE 90 | AUTO BLOWER LEVEL+15 |

VEHICULAR AIR-CONDITIONER

BACKGROUND OF THE INVENTION

1. Field of the Invention

The present invention relates to a vehicle air-conditioner conditioning the air inside a vehicle compartment.

2. Description of the Related Art

In the past, in automatic air-conditioning control of a vehicular air-conditioner, the inside/outside air intake mode, blowing port mode, and blower level have been controlled based on a target blowing temperature TAO so as to maintain the vehicle compartment temperature at a set temperature (for example, see Japanese Patent Publication (A) No. 2000-142077).

In this control, in air-conditioning in the winter, in particular at times of low outside air temperature, the outside air mode was used for the air-conditioning in order to prevent the front window glass from fogging up. Further, at the initial start of heating, the blowing port mode was set to the foot/defrost mode for a certain time in order to prevent the front window glass from fogging up.

However, along with the recent improvements in engine efficiency, the amount of heat given from the engine to the engine cooling water has been reduced and the engine cooling water no longer rises in temperature. For this reason, the heating capacity becomes insufficient. In particular, when heating in the outside air mode at the time of a low outside air temperature, the heating capacity will drop, the temperature inside the vehicle compartment will not rise, and passenger comfort will be impaired.

If setting the inside air mode, inside air is introduced, so the temperature of the introduced air can be raised compared with the outside air mode. For this reason, the temperature of the air inside the vehicle compartment can be raised faster. While the problem of the insufficient heating capacity can be eliminated, when setting the inside air mode, the humidity resulting from the respiration of the passengers causes the humidity in the vehicle compartment to immediately rise and ends up causing the front window glass to fog up.

SUMMARY OF THE INVENTION

An object of the present invention is to provide a vehicle air-conditioner designed to suppress fogging of the window glass and suppress a drop in the heating capacity.

To achieve this object, the present invention provides a vehicle air-conditioner provided with an air-conditioning means (30) for introducing at least one of inside air and outside air, adjusting the state of the introduced air, and blowing it out into a vehicle compartment, the vehicle air-conditioner further provided with a humidity detecting means (17) for detecting a humidity inside the vehicle compartment, judging means (S210, S240) for judging whether window glass of the vehicle compartment is liable to fog up in accordance with the humidity detected by the humidity detecting means, defrost control means (S260) for controlling the air-conditioning means to prevent the window glass from fogging up as defrost control when the window glass inside the vehicle compartment is judged liable to fog up by the judging means and not performing the defrost control when the window glass in the vehicle compartment is judged resistant to fogging by the judging means, and inside air introduction control means (S250) for controlling the air-conditioning means so as to introduce at least the inside air into the vehicle compartment when the window glass inside the vehicle compartment is judged resistant to fogging by the judging means.

Therefore, according to the present invention, by using the inside air introduction control means so as to introduce inside air into the vehicle compartment, compared with the outside air mode of introducing only outside air, the introduced air can be raised in temperature, so the heating performance can be improved. Further, when the window glass is judged liable to fog up, the defrost control means is operated, so the window glass can be kept from fogging and the heating capability can be kept from falling.

Specifically, it is possible to provide a calculating means (10) for finding the degree of ease of fogging of the window glass based on the humidity detected by the humidity detecting means and to have the judging means judge whether the window glass in the vehicle compartment is liable to fog up based on the degree of ease of fogging of the window glass.

Further, the calculating means may be designed to find a relative humidity near the inside surface of the window glass as the degree of ease of fogging of the window glass.

Further, the defrost control means may be designed to control the air-conditioning means to introduce only outside air and prevent the window glass from fogging up when performing the defrost control.

Further, the vehicle air-conditioner may be provided with an instruction value calculating means (S230) for calculating an inside air instruction value (S) for determining a ratio of the inside air and the outside air which the air-conditioning means introduces into the vehicle compartment based on the degree of ease of fogging of the window glass, and the judging means may be designed to judge if the window glass in the vehicle compartment is liable to fog up in accordance with the inside air instruction value.

The judging means may judge that the window glass in the vehicle compartment is liable to fog up when an inside air instruction value for introducing only outside air into the vehicle compartment is calculated by the instruction value calculating means and the judging means may judge that the window glass in the vehicle compartment is resistant to fogging when an inside air instruction value for introducing inside air and outside air into the vehicle compartment is calculated by the instruction value calculating means.

The vehicle air-conditioner may have a first control mode which stepwisely increases the ratio of inside air introduced into the vehicle compartment, a second control mode which maintains the ratio of the inside air and outside air introduced into the vehicle compartment, and a third control mode which stepwisely increases the ratio of the outside air introduced into the vehicle compartment, and the instruction value calculating means may select one of the first to third control modes in accordance with the degree of ease of fogging of the window glass. According to this, the ratio of the inside air introduced into the vehicle compartment can be finely controlled in accordance with the degree of ease of fogging of the window glass.

The vehicle air-conditioner may further have a fourth control mode which introduces just outside air into the vehicle compartment, the instruction value calculating means may select one of the first to third control modes when the degree of ease of the window glass is less than a threshold value and select the fourth control mode when the degree of ease of fogging of the window glass is the threshold value or more, the air-conditioning means may have a heating use heat exchanger (44) for adjusting the temperature of the air blown into the vehicle compartment by the engine cooling water, and the threshold value used when the water temperature of the engine cooling water is less than a predetermined temperature may be set higher than the threshold value used when the water temperature of the engine cooling water is the predetermined temperature or more.

Normally, at the initial start of a heating operation when the water temperature of the engine cooling water is low, the heating use heat exchanger cannot be used to adjust the temperature well, so cool air is blown to the passengers and the passengers are discomforted. As opposed to this, the threshold value used when the water temperature of the engine cooling water is less than the predetermined temperature is set higher than the threshold value used when the water temperature of the engine cooling water is the predetermined temperature or more, so the fourth control mode becomes difficult to select when the water temperature of the engine cooling water is less than the predetermined temperature. Therefore, it is possible to prevent the fourth control mode from being executed and cool air being blown to the passengers and discomforting the passengers.

The air-conditioning means may have a plurality of blowing ports (48 to 50) for blowing air into the vehicle compartment, and the defrost control means may switch the blowing ports blowing air into the vehicle compartment among the plurality of blowing ports so as to prevent fogging of the window glass.

At the initial start of heating when the engine cooling water is low in temperature, sometimes the air-conditioning air is not sufficiently warmed and cool air is blown out from the blowing ports.

Therefore, the air-conditioning means may having a heating use heat exchanger (44) for adjusting the temperature of the air blown into the vehicle compartment by the engine cooling water, the air-conditioning means may switch the blowing ports for blowing air into the vehicle compartment among the plurality of blowing ports in accordance with the degree of ease of fogging of the window glass when the water temperature of the engine cooling water is a predetermined temperature or more, and the air-conditioning means may set a defrost mode which blows air toward the inside surface of the window glass when the water temperature of the engine cooling water is less than the predetermined temperature.

In this case, even if cool air is blown out at the initial start of the heating operation, the cool air can be kept from being blown directly to the passengers. Therefore, the cool air can be kept from discomforting the passengers.

Further, if using the air-conditioning means to increase the amount of air blown out from the blowing ports along with the rise in the degree of ease of fogging of the window glass, it is possible to prevent fogging well in accordance with the degree of ease of fogging of the window glass.

Further, when a mode for introducing only inside air into the vehicle compartment is manually set, the defrost control means may control the air-conditioning means so as to actuate the defrost control regardless of the degree of ease of fogging of the window glass.

According to this, if a mode for introducing only inside air into the vehicle compartment is set, fogging of the window glass more easily occurs due to the humidity resulting from the respiration of the passengers, but actuation of the defrost control enables the occurrence of fogging to be suppressed in advance.

Specifically, when a mode for introducing only inside air into the vehicle compartment is manually set, if the degree of ease of fogging of the window glass is less than a predetermined value (TRHW+c3), defrost control is performed for preventing the window glass from fogging up while introducing the inside air, while if the degree of ease of fogging of the window glass is the predetermined value (TRHW+c3) or more, defrost control is performed for preventing the window glass from fogging up by switching the introduced air from inside air to outside air.

Note that the reference numerals in parentheses after the means show examples of the correspondence with the specific means described in the later explained embodiments.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

First Embodiment

Figure 1:
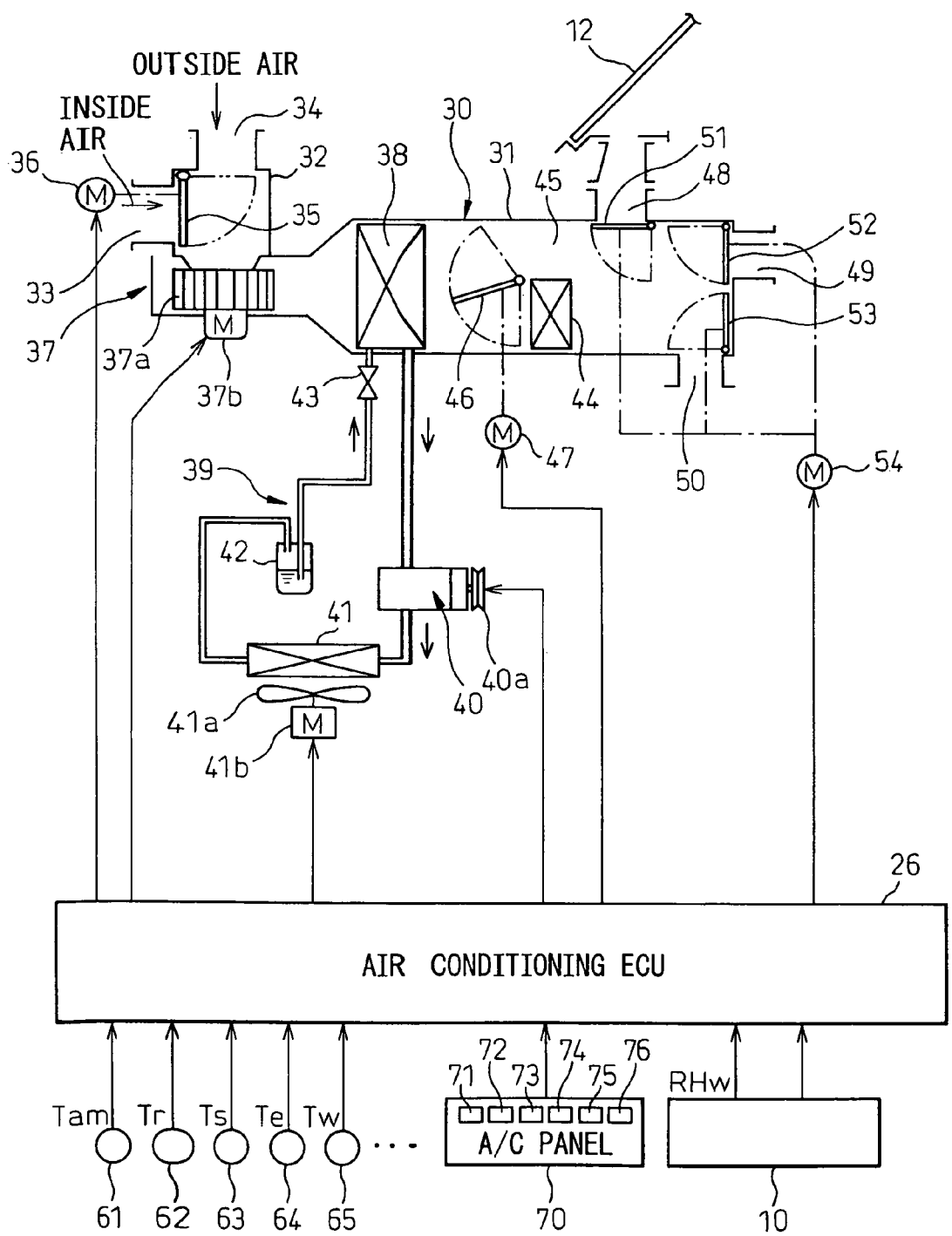
FIG. 1 is a view of the overall system configuration of a vehicle air-conditioner according to a first embodiment of the present invention.

FIG. 1 shows the schematic configuration of a vehicle air-conditioner according to a first embodiment of the present invention.

The vehicle air-conditioner has an inside air-conditioning unit 30 arranged behind an instrument panel at the front most part of a passenger compartment. This inside air-conditioning unit 30 has a case 31. Inside the case 31, an air passage is formed for blowing air toward the inside of the vehicle compartment.

At the upstream most part of the air passage of the case 31, an inside/outside air switching box 32 is provided. An inside air introduction port 33 and an outside air introduction port 34 are able to be switched to open and close by an inside/outside air switching door 35. This inside/outside air switching door 35 is driven by a servo motor 36.

At the downstream side of the inside/outside air switching box 32, an electrically powered blower 37 is provided for blowing air toward the inside of the vehicle compartment. This blower 37 is comprised of a centrifugal blowing fan 37a driven by a motor 37b. At the downstream side of the blower 37, an evaporator 38 forming a cooling/heating heat exchanger is provided for cooling the blown air.

This evaporator 38 is one of the elements forming part of a refrigeration cycle apparatus 39. A low temperature, low pressure refrigerant evaporates while absorbing heat from the blown air so as to thereby cool the blown air. Note that the refrigeration cycle apparatus 39 is known and is configured so that the refrigerant circulates from a discharge side of the compressor 40 through a condenser 41, liquid receiver 42, and expansion valve 43 forming a pressure reducing means to the evaporator 38. The condenser 41 is blown with outside air (cooling air) by an electrically powered cooling fan 41a. This cooling fan 41a is driven by a motor 41b.

In the refrigeration cycle apparatus 39, the compressor 40 is driven by a vehicle engine (not shown) through an electromagnetic clutch 40a. Therefore, the operation of the compressor 40 can be controlled to start and stop by the current flow of the electromagnetic clutch 40a.

On the other hand, in the inside air-conditioning unit 30, a heater core 44 is provided at the downstream side of the evaporator 38 for heating the air flowing through the case 31. This heater core 44 is a heating use heat exchanger for heating the air passed through the evaporator 48 (cool air) using the warm water of the vehicle engine (that is, the engine cooling water) as a heat source. A bypass passage 45 is formed at the side of the heater core 44. Bypass air of the heater core 44 flows through this bypass passage 45.

Between the evaporator 38 and the heater core 44 is rotatably provided an air mix door 46 forming a temperature adjusting means. This air mix door 46 is driven by a servo motor 47 and can be continuously adjusted in its rotational position (opening degree).

The opening degree of the air mix door 46 may be used to adjust the ratio between the amount of air passing through the heater core 44 (amount of warm air) and the amount of air passing through the bypass passage 45 and bypassing the heater core 44 (amount of cool air) and thereby adjust the temperature of the air blown out into the vehicle compartment.

At the downstream most part of the air passage of the case 31, a total of three types of blowing ports are provided: a defroster blowing port 48 for blowing out air-conditioning air toward the front window glass 12 of the vehicle, a face blowing port 49 for blowing out air-conditioning air toward the faces of the passengers, and a foot blowing port 50 for blowing out air-conditioning air toward the feet of the passengers.

At the upstream parts of these blowing ports 48 to 50 are rotatably provided a defroster door 51, a face door 52, and a foot door 53, respectively. These doors 51 to 53 are operated to open and close by a common servo motor 54 through a not shown link mechanism.

An air-conditioning electronic control device 26 is comprised of a known microcomputer including a central processing unit (CPU), read only memory (ROM), random access memory (RAM), etc. and its peripheral circuits. This air-conditioning electronic control device 26 stores in its ROM a computer program for air-conditioning control and performs various operations and processing based on this computer program.

The air-conditioning electronic control device 26 receives as input a detection value of a later explained detection device 10 and receives as input detection signals from a group of known air-conditioning sensors 61 to 65 and various operational signals from an air-conditioning control panel 70.

As the group of air-conditioning sensors, specifically, an outside air sensor 61 for detecting an outside air temperature (temperature outside vehicle compartment) Tam, an inside air sensor 62 for detecting an inside air temperature (temperature inside vehicle compartment) Tr, a sunlight sensor 63 for detecting the amount of sunlight Ts entering the vehicle compartment, an evaporator temperature sensor 64 arranged at the air blowing part of the evaporator 38 and detecting an evaporator blowing air temperature Te, a water temperature sensor 65 for detecting a temperature Tw of warm water (engine cooling water) flowing into the heater core 44, etc. are provided.

Further, the air-conditioning control panel 70 is provided with various air-conditioning control members such as a temperature setting switch 71 forming a temperature setting means for setting a vehicle compartment inside temperature, a blowing mode switch 72 for manually setting a blowing mode switched by blowing mode doors 51 to 53, an inside/outside air switch 73 for manually setting an inside/outside air intake mode by an inside/outside air switching door 35, an air-conditioner switch 74 for emitting an actuation instruction signal of the compressor 40 (ON signal of electromagnetic clutch 40a), a blower actuation switch 75 for manually setting a flow rate of the blower 37, an auto switch 76 for emitting an instruction signal of the state of air-conditioning automatic control, etc.

At the output side of the air-conditioning electronic control device 26, the electromagnetic clutch 40a of the compressor 40, the servo motors 36, 47, and 54 forming the electrical drive means of different equipment, the motor 37b of the blower 37, the motor 41b of the condenser cooling fan 41a, etc. are connected. The operations of these equipment are controlled by output signals of the air-conditioning electronic control device 26.

Figure 2:
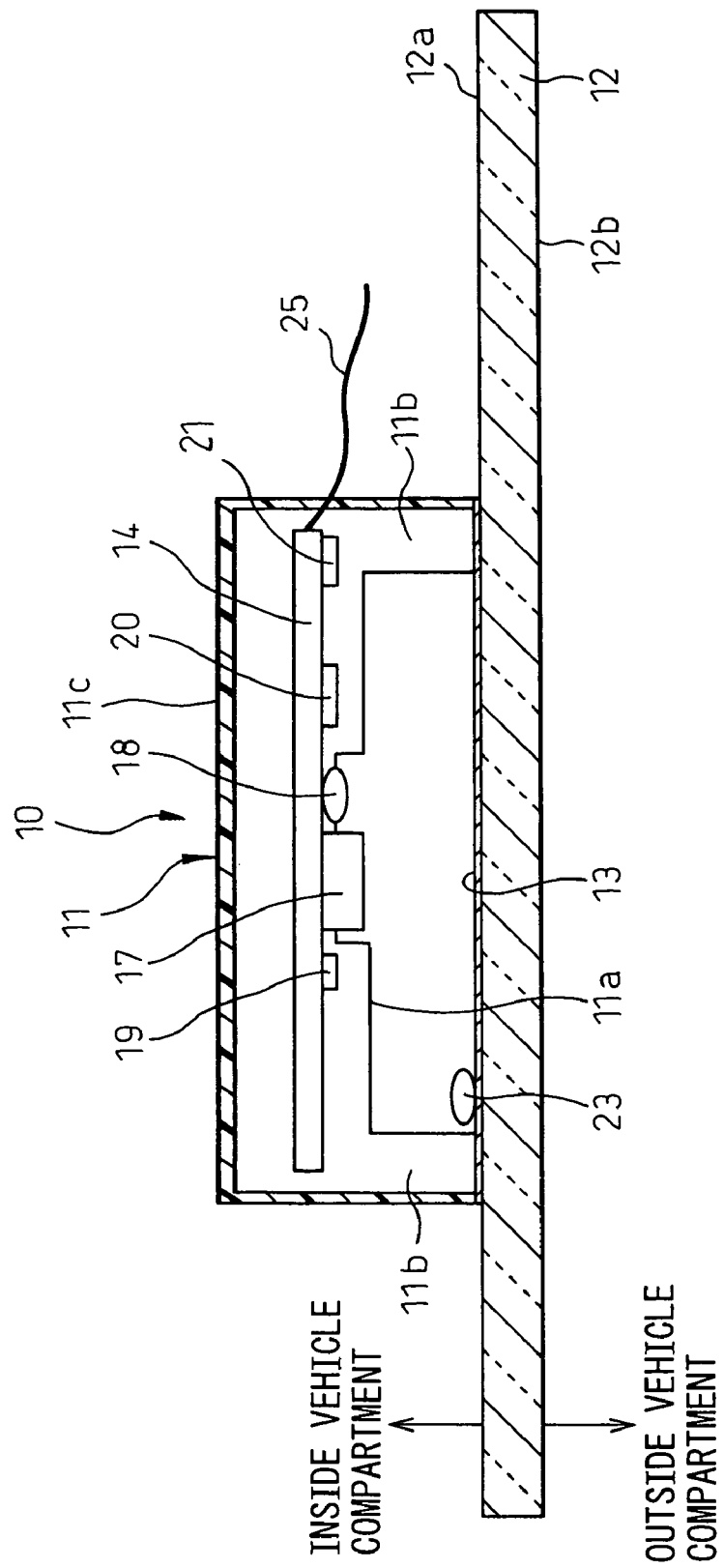
FIG. 2 is a schematic cross-sectional view of a detection device of FIG. 1.
Figure 3:
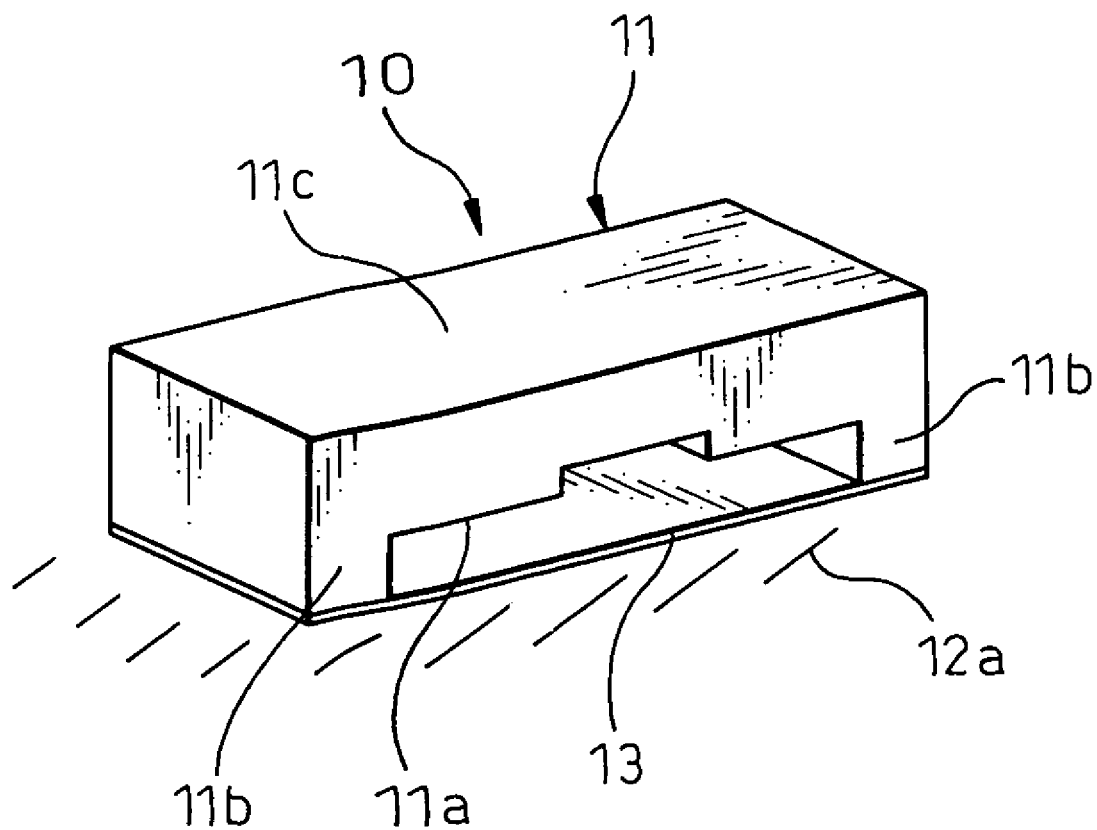
FIG. 3 is a schematic perspective view of a detection device of FIG. 1.
Figure 4:
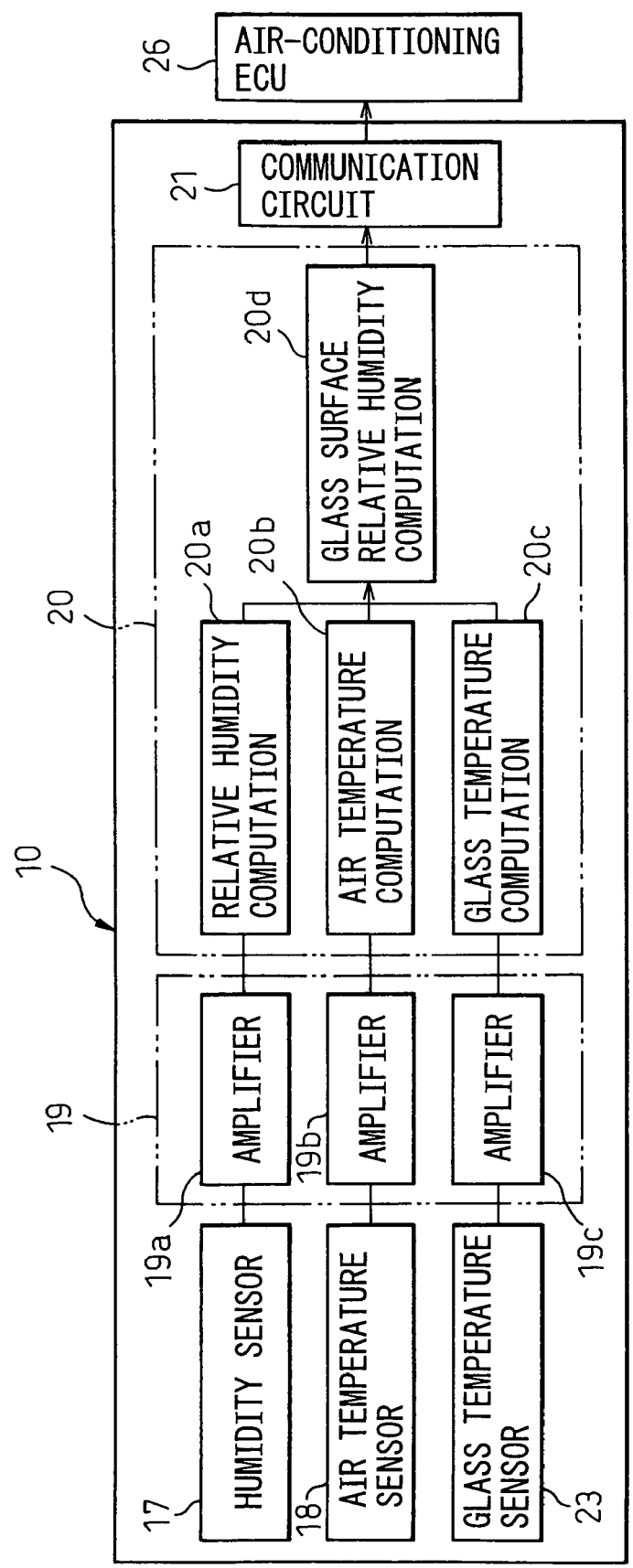
FIG. 4 is a block diagram of an electrical system of the detection device of FIG. 1.

Next, the configuration of the detection device 10 will be explained using FIG. 2 to FIG. 4. FIG. 2 is a schematic cross-sectional view showing the state of the detection device 10 attached to the inside surface of the window glass of a vehicle (specifically, the front window glass), FIG. 3 is a schematic perspective view of the detection device 10, and FIG. 4 is a view of the electrical configuration of the detection device 10.

The detection device 10 has a case formed by a plastic etc. This case 11 is a thin box shape with a low height. The bottom is completely open.

The walls of the front and back of the case 11 are formed with projecting openings 11a. These front and back openings 11a enable the space inside the case 11 to be constantly communicated with the surrounding space, that is, the vehicle compartment inside space. In the front and back walls of the case 11, the left and right side parts of the openings 11a form stays 11b for mounting to the inside surface 12a of the window glass 12.

The window glass 12 is in this example the front glass of the vehicle. The top side in FIG. 1 shows the inside surface 12a facing the inside of the vehicle compartment, while the bottom side in FIG. 1 shows the outside surface 12b facing the outside of the vehicle compartment. Therefore, FIG. 2 shows the inside surface 12a of the window glass 12. At the bottom end faces of the mounting stays 11b, a light barrier film 13 is attached. Further, the light barrier film 13 is attached to the inside surface 12a of the window glass 12. Note that the light barrier film 13 may be attached to the bottom end faces of the mounting stays 11b and the inside surface of the window glass 12 by a binder or other means.

In the inside space of the case 11 between the top ends of the openings 11a and the top side walls 11c, a circuit board 13 is arranged parallel to the surface of the window glass 12. A not shown attachment means is used to fasten the circuit board 14 to the inside wall of the case 11. The circuit board 14 is a member comprised of an insulating board on which conductive circuit parts are formed and is generally called a "printed circuit board". The sensors and circuit parts explained below are mounted on it.

The front surface of the circuit board 13 at the window glass 12 side (bottom surface in FIG. 1) has a humidity sensor 17, air temperature detection temperature sensor 18, amplifier 19, processing circuit 20, and communication circuit 21 mounted on it.

Note that the humidity sensor 17 and the temperature sensor 18 are arranged at the center of the circuit board in the longitudinal direction (left-right direction of FIG. 2) and are arranged near the top ends of the openings 11a, that is, at the portions communicating with the vehicle compartment inside space. For this reason, the humidity sensor 17 and the temperature sensor 18 can detect a representative humidity and temperature of the air near the inside surface of the window glass inside the vehicle compartment.

At one location of the front surface of the light barrier film 13 at the sensor side, a temperature sensor 23 for detecting the glass temperature is integrally provided. The light barrier film 13 is a thin film-like member with a high heat conductivity as explained above, so becomes substantially the same temperature as the surface temperature of the window glass at the inside of the vehicle compartment (inside surface temperature).

Note that in this example, as the humidity sensor 17, a humidity sensitive film having a dielectric constant changing in accordance with the relative humidity of the air and thereby having an electrostatic capacity changing in accordance with the relative humidity of the air, that is, a capacity changing type, is used. Further, as the temperature sensors 18 and 23, thermistors having resistance values changing in accordance with the temperature are used.

A lead wire 25 includes a power line and communication line taken out from the inside space of the case 11 to the outside of the case 11 and electrically connects electrical circuit parts of the circuit board 14 (amplifier 19, processing circuit 20, and communication circuit 21) and external circuits (later explained air-conditioning electronic control device 26, vehicle power supply, etc. of FIG. 4).

Note that the mounting stays 11b of the case 11 explained above function as positioning means for defining the distances between the circuit board 13 and the various types of sensors mounted on the circuit board 14 and the inside surface 12a of the window glass 12.

Next, explaining the electrical configuration of the detection device 10 by FIG. 4, the output signals of the sensors 17, 18, and 23 are amplified by the amplifiers 19a to 19d and supplied to the processing circuits 20a to 20c.

Further, the processing circuit 20a computes the relative humidity RH of the vehicle compartment inside air near the window glass based on the output value V of the humidity sensor 17 (specifically, the output value of the amplification circuit 20a). That is, a predetermined computation formula for converting the output value V of the humidity sensor 17 to relative humidity RH is set in advance. By applying the output value V to this computation formula, the relative humidity RH is computed. The following formula (1) is a specific example of this humidity computation formula:

$$RH = \alpha V + \beta \quad (1)$$

where, $\alpha$ is a control coefficient and $\beta$ is a constant

Next, the processing circuit 20b applies the output value of the air temperature sensor 18 (specifically, the output value of the amplification circuit 20b) to the preset predetermined computation formula so as to calculate the vehicle compartment inside air temperature near the window glass.

Further, the processing circuit 20c applies the output value of the glass temperature sensor 23 (specifically, the output value of the amplification circuit 20c) to a preset predetermined computation formula so as to compute the window glass temperature (glass inside surface temperature).

Further, the processing circuit 20d computes the window glass surface relative humidity (window glass inside surface relative humidity) RHW based on the relative humidity RH, air temperature, and window glass temperature. That is, it is possible to use a humid air graph so as to compute the window glass surface relative humidity RHW from the relative humidity RH, the air temperature, and the window glass temperature. Further, the window glass surface relative humidity RHW is output through the communication circuit 21 to the air-conditioning electronic control device 26.

Next, the operation of the present embodiment in the above configuration will be explained. First, explaining the operation of the inside air-conditioning unit 30 in brief, the blower 37 is actuated so as to blow air introduced from the inside air introduction port 33 or the outside air introduction port 34 through the inside of the case 31 toward the inside of the vehicle compartment. Further, the electromagnetic clutch 40a is energized to set the electromagnetic clutch 40a in the connection state and the compressor 40 is driven by the vehicle engine so cause refrigerant to circulate through the refrigeration cycle apparatus 39.

The air blown by the blower 37 first passes through the evaporator 38 to be cooled and dehumidified. The cool air is then divided into a flow passing through the heater core 44 (warm air) and a flow passing through the bypass passage 45 (cool air) in accordance with the rotational position (opening degree) of the air mix door 46.

Therefore, it is possible to use the opening degree of the air mix door 46 to adjust the ratio between the amount of air passing through the heater core 44 (amount of warm air) and the amount of air passing through the bypass passage 45 (amount of cool air) and thereby adjust the temperature of the air blown into the vehicle compartment.

Next, the air-conditioning air adjusted in temperature is blown out into the vehicle compartment from one or more of the defroster blowing port 48, face blowing port 49, and foot blowing port 50 positioned at the downstream most part of the air passage of the case 31 so as to air-condition the inside of the vehicle compartment and defrost the front window glass 12 of the vehicle.

Figure 5:
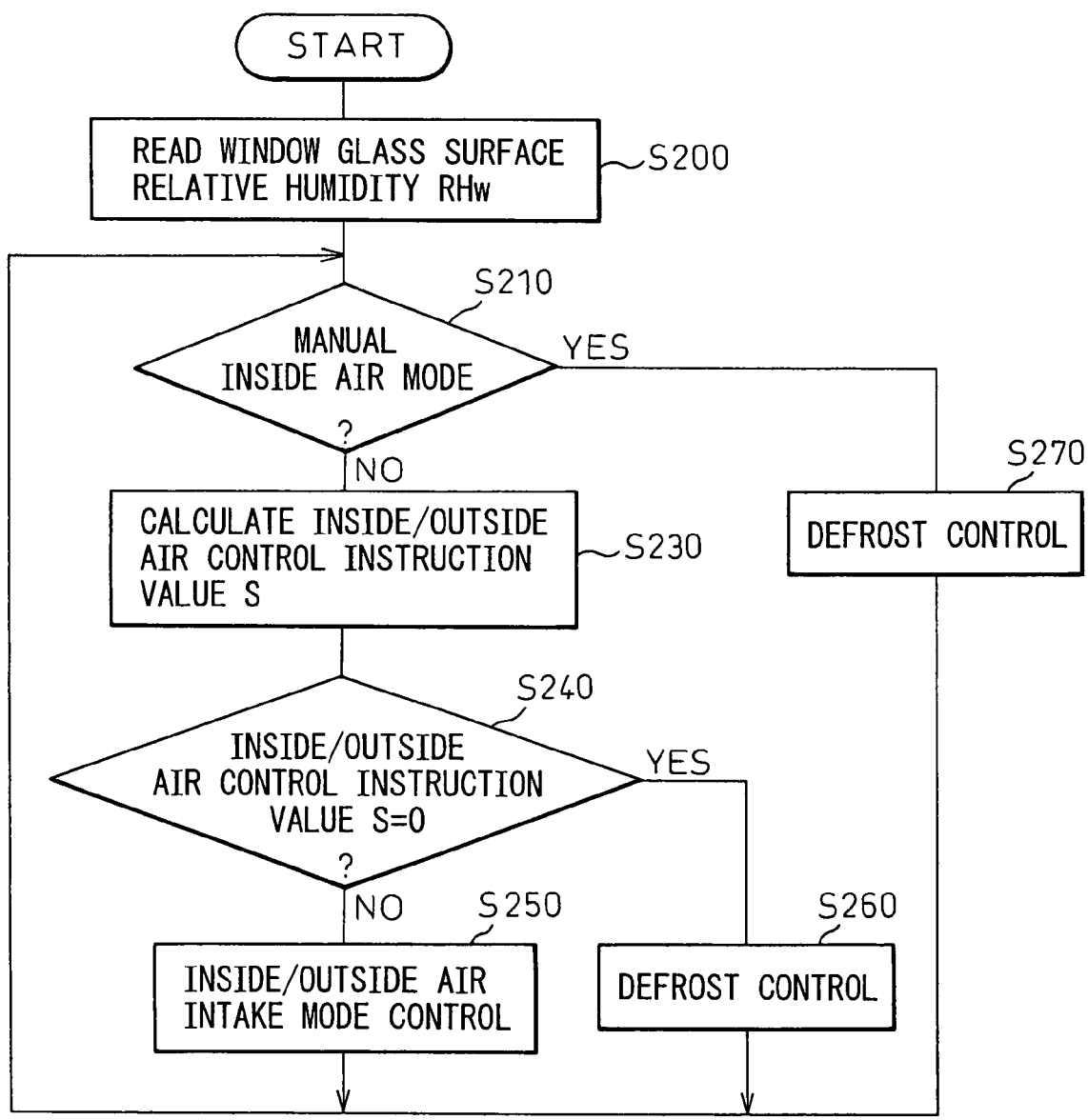
FIG. 5 is a flow chart showing the basic logic of air-conditioner control according to the first embodiment.

Next, the air-conditioning control based on the window glass surface relative humidity RHW will be explained. FIG. 5 is a control routine executed by the air-conditioning electronic control device 26. First, the window glass surface relative humidity RHW computed by the detection circuit 10 is read (S200).

Next, whether the inside/outside air intake mode is manually set to the inside air mode by the inside/outside air switch 73 of the air-conditioning control panel 70 is judged (S210). When the judgment is NO, an inside/outside air control instruction value S is calculated (S230).

Figure 6:
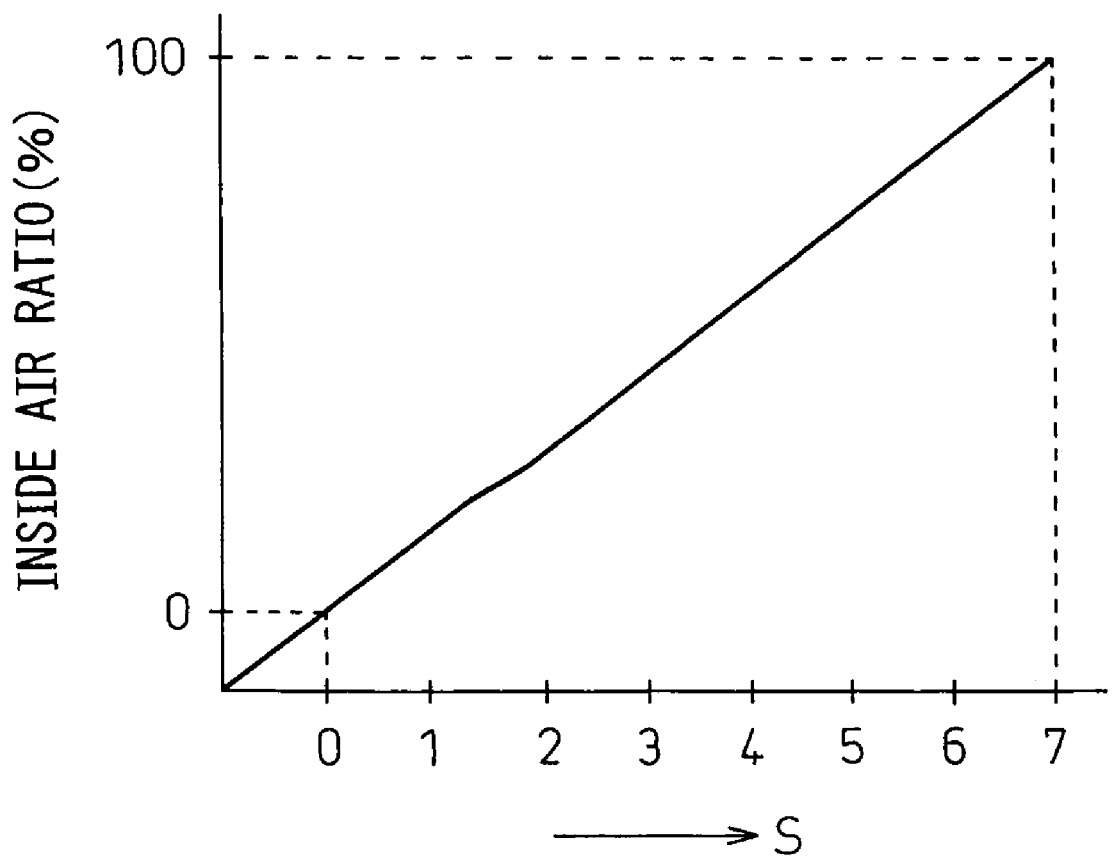
FIG. 6 is a graph showing the relationship between the inside/outside air control instruction value and inside air ratio.

Here, the inside/outside air control instruction value S, as shown in FIG. 6, is a numerical value for determining a ratio of introduction of inside air into the vehicle compartment. In the example of FIG. 6, when S=0, the inside air ratio=0% (that is, outside air mode with outside air: 100%) is set, while when S=7, the inside air ratio=100% (that is, the inside air mode) is set. The inside air ratio successively increases from S=1 to S=7.

Figure 7:
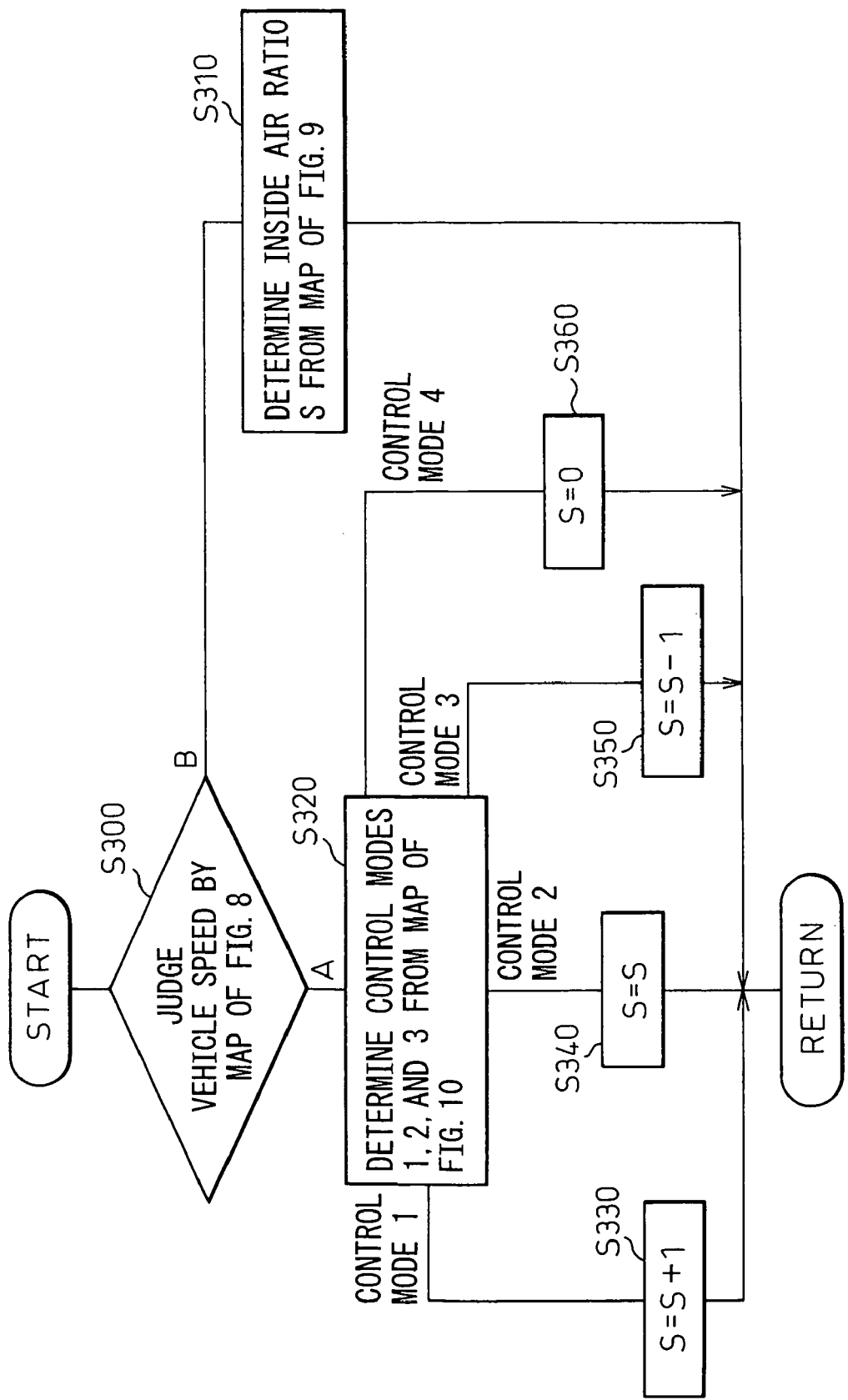
FIG. 7 is a flow chart showing the inside/outside air control logic according to the first embodiment.

FIG. 7 is a flow chart for explaining a specific example of the processing for calculating the above inside/outside air control instruction value S (S230). Referring to FIG. 7, the processing for calculating the above inside/outside air control instruction value S (S230) will be explained specifically.

Figure 8:
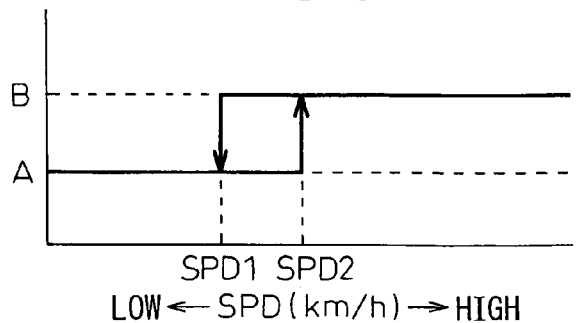
FIG. 8 is a graph for judgment of the vehicle speed in inside/outside air control.
Figure 9:
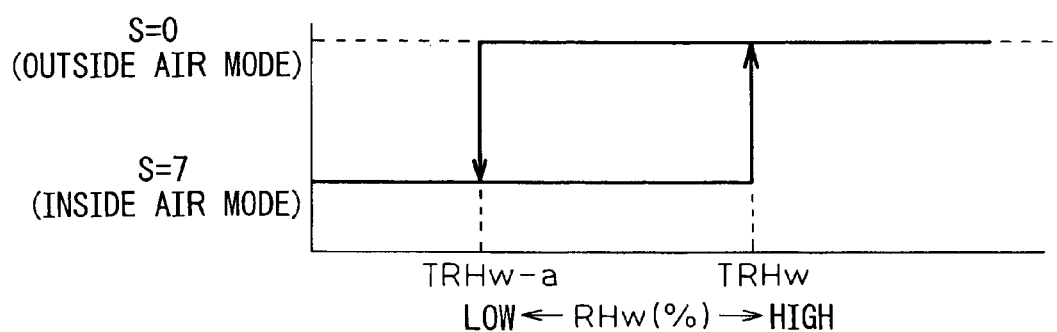
FIG. 9 is a graph showing the relationship between a window glass surface relative humidity and the inside/outside air control instruction value (inside/outside air intake mode)

First, whether the vehicle speed SPD is in the low speed region A or the high speed region B is judged based on the map of FIG. 8 (S300). Further, when the vehicle speed SPD is in the high speed region B, as shown by the map of FIG. 9, the inside/outside air control instruction value S is determined based on the window glass surface relative humidity RHW (S310).

That is, if the window glass surface relative humidity RHW rises above a first target window glass surface relative humidity TRHW, the window glass is deemed liable to fog up and S=0 (outside air mode) is set. Further, if the window glass surface relative humidity RHW falls below a second target window glass surface relative humidity (TRHW−a), the window glass is deemed resistant to fogging and S=7 (inside air mode) is set.

Here, as the first target window glass surface relative humidity TRHW, a level near the upper limit humidity where the window glass will not fog up, for example, 80%, is used. As the second target window glass surface relative humidity (TRHW−a), for example, 65% is used (a=15%).

Figure 10:
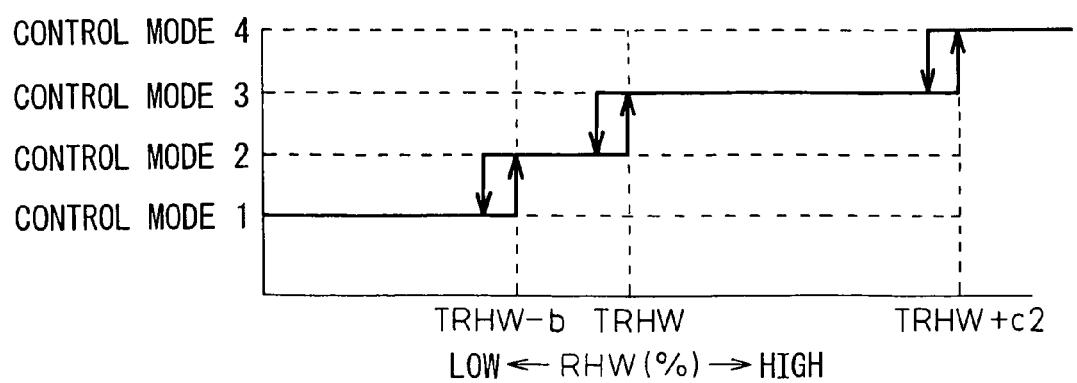
FIG. 10 is a graph showing the relationship between the window glass surface relative humidity and the control modes.

On the other hand, when the vehicle speed SPD is in the low speed region A, the control modes 1, 2, 3, and 4 shown in the map of FIG. 10 are decided on based on the window glass surface relative humidity RHW (S320).

That is, when the window glass surface relative humidity RHW rises above a third window glass surface relative humidity (TRHW+c2), the control mode 4 is decided on. Further, when the window glass surface relative humidity RHW is between the third target window glass surface relative humidity. (TRHW+c2) and the first target window glass surface relative humidity (TRHW), the control mode 3 is decided on.

Further, when the window glass surface relative humidity RHW is between the first target window glass surface relative humidity (TRHW) and the fourth target window glass surface relative humidity (TRHW−b), the control mode 2 is decided on, while when the window glass surface relative humidity RHW is lower than the fourth target window glass surface relative humidity (TRHW−b), the control mode 1 is decided on.

Note that the control mode 1 corresponds to the first control mode described in the claims, the control mode 2 corresponds to the second control mode described in the claims, the control mode 3 corresponds to the third control mode described in the claims, and the control mode 4 corresponds to the fourth control mode described in the claims.

Here, the humidity becomes higher in the order of the fourth target window glass surface relative humidity (TRHW−b)→the first target window glass surface relative humidity (TRHW)→the third target window glass surface relative humidity (TRHW+c2). In this order, the window glass gradually tends to become easier to fog up.

Note that as the fourth target window glass surface relative humidity (TRHW−b), for example, 70% is used (b=10% A), while as the third target window glass surface relative humidity (TRHW+c2), for example, 95% is used (c2=15%)

Further, when deciding on the control mode 1, the control processing of S=S+1 is performed with every elapse of a predetermined time (S330). That is, with every elapse of a predetermined time, control processing is performed for increasing the value of the inside/outside air control instruction value S by "1" and successively increasing the inside air ratio by increments of a predetermined ratio.

Further, when deciding on the control mode 2, the window glass surface relative humidity RHW is near the target window glass surface relative humidity TRHW, so control processing for S=S, that is, control processing for maintaining the previously calculated value of S as the value of the inside/outside air control instruction value S is performed (S340).

Further, when deciding on the control mode 3, the control processing of S=S−1 is performed with every elapse of a predetermined time (S350). That is, with every elapse of a predetermined time, control processing is performed for decreasing the value of the inside/outside air control instruction value S by "1" and successively decreasing the inside air ratio by decrements of a predetermined ratio. Therefore, when deciding on the control mode 3, even if first the inside/outside air control instruction value S is not 0, if repeating S=S−1 along with the elapse of time, the inside/outside air control instruction value S becomes 0. Further, when deciding on the control mode 4, control processing for S=0, specifically, control for executing the outside air mode, is performed (S360).

Returning again to FIG. 5, at step S240, whether the value of the inside/outside air control instruction value S is the value of the outside air mode (inside/outside air control instruction value S=0) is judged. Here, (1) when deciding on the control mode 4 at step S320 or (2) when repeating S=S−1 along with the elapse of time after deciding on the control mode 3 at step S320, the inside/outside air control instruction value S becomes 0, so YES is judged. That is, by judging if the inside/outside air control instruction value S=0, whether the window glass is liable to fog up is judged. Next, when the inside/outside air control instruction value S=0, the window glass is judged liable to fog up, then the routine proceeds to S250, where control for preventing the window glass from fogging up (hereinafter referred to as the "auto mode defrost control") is performed.

Further, when the inside/outside air control instruction value S is not 0 at step S240, NO is judged, then the routine proceeds to step S250. Along with this, the position of the inside/outside air switching door 35 is controlled to give an inside air ratio based on the value of the inside/outside air control instruction value S and thereby execute inside/outside air intake mode control.

Here, as explained above, when the window glass surface relative humidity RHW is lower than the first target window glass surface relative humidity (TRHW), the control modes 1 and 2 are decided on and the inside/outside air control instruction value S is not 0. The first target window glass surface relative humidity TRHW is set near the upper limit humidity where the window glass will not fog up, so in control of the inside/outside air intake mode, the inside/outside air intake mode can be controlled so that the inside air ratio constantly becomes higher in the range where the window glass will not fog up. Due to this, it is possible to raise the inside air ratio at the time of startup of the heating operation in the winter so as to reduce heat loss due to change of the air and promote the start of the vehicle compartment inside heating effect.

Note that the inside/outside air intake mode control corresponds to the "inside air introduction control means for introducing at least inside air into the vehicle compartment" of claim 1.

As explained above, at S240, which of the inside/outside air intake mode control and the auto mode defrost control (corresponding to the defrost control means of claim 1) to actuate is determined in accordance with the inside/outside air control instruction value S.

On the other hand, when the judgment of step S210 of FIG. 5 is YES, the need for preventing the window glass from fogging up is high. In this case, the routine proceeds to step S270, where defrost control of the window glass (hereinafter referred to as "manual mode defrost control) is performed.

In the above way, either of the manual mode defrost control, inside/outside air intake mode control, and auto mode defrost control is performed, then the processings of S200, S210, S230, S240, S250, and S270 are repeated.

Figure 11:
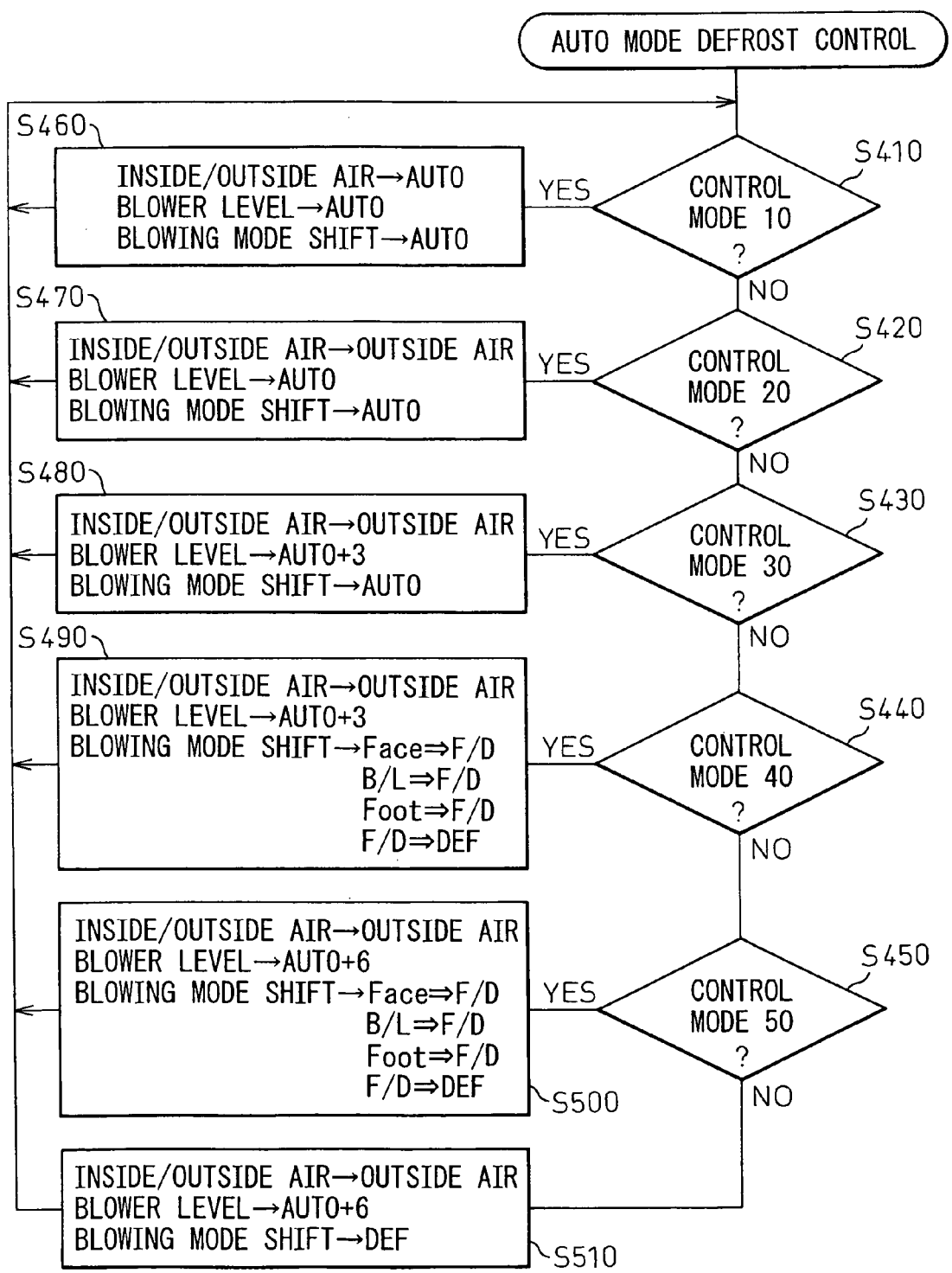
FIG. 11 is a flow chart showing the defrost control logic according to the first embodiment.
Figure 12:
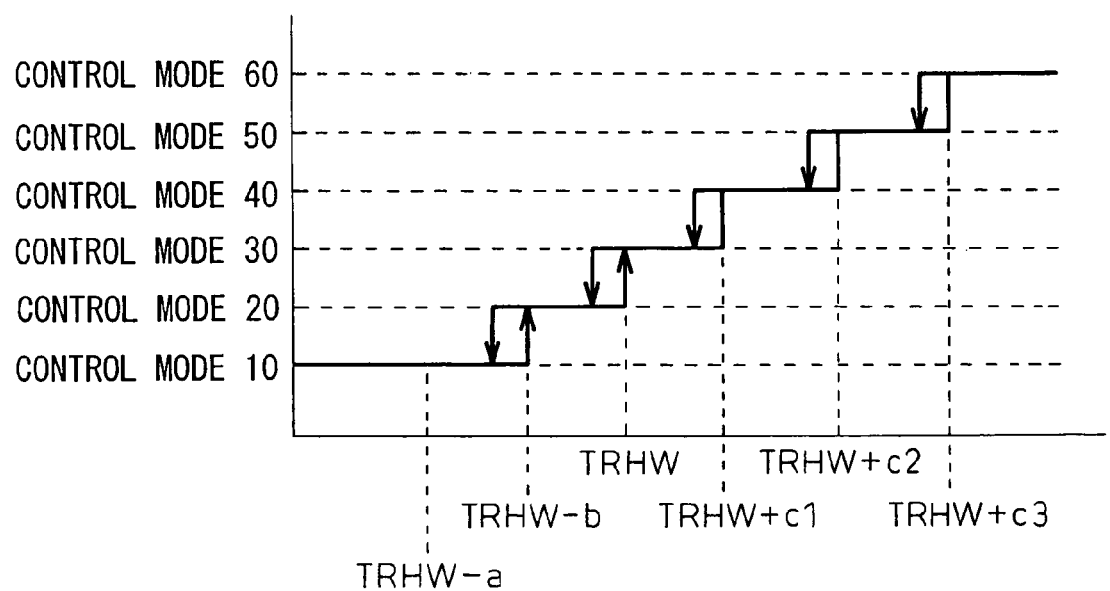
FIG. 12 is a graph showing the relationship between the window glass surface relative humidity and the control modes.

Next, the auto mode defrost control and the manual mode defrost control will be individually explained. First, the auto mode defrost control will be explained. FIG. 11 is a flow chart showing a specific example of the defrost control (S260), while FIG. 12 is a control map for selecting the control mode in the auto mode defrost control.

First, at steps S410 to S450 of FIG. 11, either of the control mode 10 to the control mode 50 is selected based on the window glass surface relative humidity RHW.

Specifically, when the window glass surface relative humidity RHW is lower than the fourth target window glass surface relative humidity (TRHW−b), YES is judged at step S410 and the control mode 10 is selected and executed at S460. Note that b in FIG. 12 is a value the same as the b in FIG. 10. Further, the control processing of the control mode 10 will be explained later.

When the window glass surface relative humidity RHW is lower than the first target window glass surface relative humidity TRHW and higher than the fourth target window glass surface relative humidity (TRHW−b), YES is judged at S420 and the control mode 20 is selected and executed at S470. Further, the control processing of the control mode 20 will be explained later.

When the window glass surface relative humidity RHW is lower than the fifth target window glass surface relative humidity (TRHW+c1) and higher than the first target window glass surface relative humidity TRHW, YES is judged at S430 and the control mode 30 is selected and executed at S480.

Note that c1 in FIG. 12 is a value lower than c2 (for example, 10%). c2 in FIG. 12 is a value the same as c2 in FIG. 10. Further, the control processing of the control mode 30 will be explained later.

When the window glass surface relative humidity RHW is lower than the third target window glass surface relative humidity (TRHW+c2), and higher than the fifth target window glass surface relative humidity (TRHW+c1), YES is judged at S440 and the control mode 40 is selected and executed at S490. Further, the control processing of the control mode 40 will be explained later.

When the window glass surface relative humidity RHW is lower than the sixth target window glass surface relative humidity (TRHW+c3) and higher than the third target window glass surface relative humidity (TRHW+c2), YES is judged at S450 and the control mode 50 is selected and executed at S500. Note that c3 in FIG. 12 is a value lower than c2 (for example, 20%). Further, the control processing of the control mode 50 will be explained later.

When the window glass surface relative humidity RHW is higher than the sixth target window glass surface relative humidity (TRHW+c3), NO is judged at S450 and the control mode 60 is selected and executed at S510. Further, the control processing of the control mode 60 will be explained later.

In this way, the lower the window glass surface relative humidity RHW, the further the control mode is switched in the order of the control mode 60→control mode 50→control mode 40→control mode 30→control mode 20→control mode 10.

Here, in the control modes 60 to 10, the defrost effect becomes stepwisely higher in the order of the control mode 10→20→ . . . 50→60. That is, the control modes 50 and 60 are defrost control performed when the control mode 4 (that is, S=0) is decided on at the above S320 when the window glass surface relative humidity RHW is higher than the third target window glass surface relative humidity (TRHW+c2) and the window glass is most liable to fog up. The control modes 30 and 40 are performed when, after the control modes 50 and 60 are performed, the window glass surface relative humidity RHW is lower than the third target window glass surface relative humidity (TRHW+c2) and higher than the first target window glass surface relative humidity (TRHW). They are defrost control performed when S=S−1 is repeated and S=0 is judged along with the elapse of time after deciding on the control mode 3 in S320. The control modes 10 and 20 are defrost control performed in the state where the control modes 30 to 60 are repeated and the window glass surface relative humidity RHW falls below the first target window glass surface relative humidity (TRHW) and S=S=0 continues at S340. Below, the specific control processing of the control modes 10 to 60 will be explained.

Control Mode 10

When the window glass is least liable to fog up, in the control mode 10, the automatic inside/outside air switching mode (indicated as "AUTO" in FIG. 11) is executed as the inside/outside air intake model. The automatic inside/outside air switching mode is known control for switching in the order of inside air mode→inside/outside air mode→outside air mode along with the rise in the target blowing temperature TAO. The target blowing temperature TAO is the temperature of the air blown from the blowing ports 48 to 50 required for maintaining the air temperature inside the vehicle compartment at a set temperature of the temperature setting switch 71 regardless of the fluctuations in the air-conditioning load in the vehicle compartment. Note that so long as the outside air temperature is low, the outside air mode may be set rather than the automatic inside/outside air switching mode.

Further, the blowing rate of the blower 37 (hereinafter referred to as the "blower level") is set by the automatic air flow rate control based on the target blowing temperature TAO (indicated by "AUTO" in FIG. 11). In the automatic air flow rate control, when the target blowing temperature TAO is the intermediate temperature region, the blower level is at its lowest rate. The higher the target blowing temperature TAO from the intermediate temperature region, the more the blower level is raised, while the lower then target blowing temperature TAO from the intermediate temperature region, the more the blower level is lowered in known air flow rate control. Note that the air flow rate determined based on the target blowing temperature TAO in this air flow rate control is called the "auto blower level".

Next, the blowing mode is set by the automatic blowing control based on the target blowing temperature TAO (indicated as "AUTO" in FIG. 11). In automatic blowing control, the higher the target blowing temperature TAO, the more the mode is switched in the order of the face mode→bilevel mode→foot mode. Note that the face mode is the mode of opening the face blowing port 49 and closing the foot blowing port 50, the food mode is the mode of closing the face blowing port 49 and opening the foot blowing port 50, and the bilevel mode is the mode of opening both the face blowing port 49 and the foot blowing port 50.

Control Mode 20

In the control mode 20, to blow lower humidity outside air to the window glass, the inside/outside air intake mode is switched from the inside/outside air mode to the outside air mode, the blower level is set at the above-mentioned auto blower level (indicated as "AUTO" in FIG. 11), and the blowing mode is set by the automatic blowing control in the same way as the control mode 10 (indicated as "AUTO" in FIG. 11).

Control Mode 30

In the control mode 30, to blow lower humidity and higher temperature air to the window glass, the inside/outside air intake mode is switched from the inside/outside air mode to the outside air mode and the blower level is raised within a range not discomforting the passengers by setting the blower level to a flow rate of the above auto blower level plus 3 levels. Note that "1 level" is a predetermined flow rate. Further, the blowing mode is set by automatic blowing control in the same way as the control mode 10 (indicated as "AUTO" in FIG. 1).

Control Mode 40

In the control mode 40, fogging of the window glass is forcibly eliminated by switching the inside/outside air intake mode from the inside/outside air mode to the outside air mode and setting the blower level to the flow rate of the above auto blower level plus 3 levels. Further, the blowing mode is changed by the blowing mode of the previous control mode before shifting to the control mode 40.

For example, when the blowing mode of the previous control mode is the face mode (indicated as "FACE" in FIG. 11), the foot/defrost mode (indicated as "F/D" in FIG. 11) is set. The foot/defrost mode is the means of opening the defroster blowing port 48 and the foot blowing port 50. When the blowing mode of the previous control mode was the bilevel mode (indicated as "B/L" in FIG. 11), the foot/defrost mode (indicated as "F/D" in FIG. 11) is set. When the blowing mode of the previous control mode was the foot mode (indicated as "Foot" in FIG. 11), the foot/defrost mode (indicated as "F/D" in FIG. 11) is set. When the blowing mode of the previous control mode was the foot/defrost mode (indicated as "F/D" in FIG. 11), the defrost mode (indicated as "DEF" in FIG. 11) is set. The defrost mode is the mode of opening the defroster blowing port 48 and closing the face blowing port 49 and the foot blowing port 50.

Control Mode 50

In the control mode 50, to forcibly eliminate fogging of the window glass, the air flow rate from the defroster blowing port 48 is increased by switching the inside/outside air intake mode from the inside/outside air mode to the outside air mode and setting the blower level to the air flow rate of the above auto blower level plus 6 levels. Further, the blowing mode, like with the control mode 40, is changed by the blowing mode of the previous control mode and set to the foot/defrost mode or the defrost mode. Note that the processing for transition of the blowing modes is similar to the control mode 40, so its description will be omitted.

Control Mode 60

In the control mode 60, to forcibly eliminate fogging of the window glass, the inside/outside air intake mode is switched from the inside/outside air mode to the outside air mode and the blower level is set to the air flow rate of the above auto blower level plus 6 levels. Further, the blowing mode is set to the defrost mode.

Figure 13:
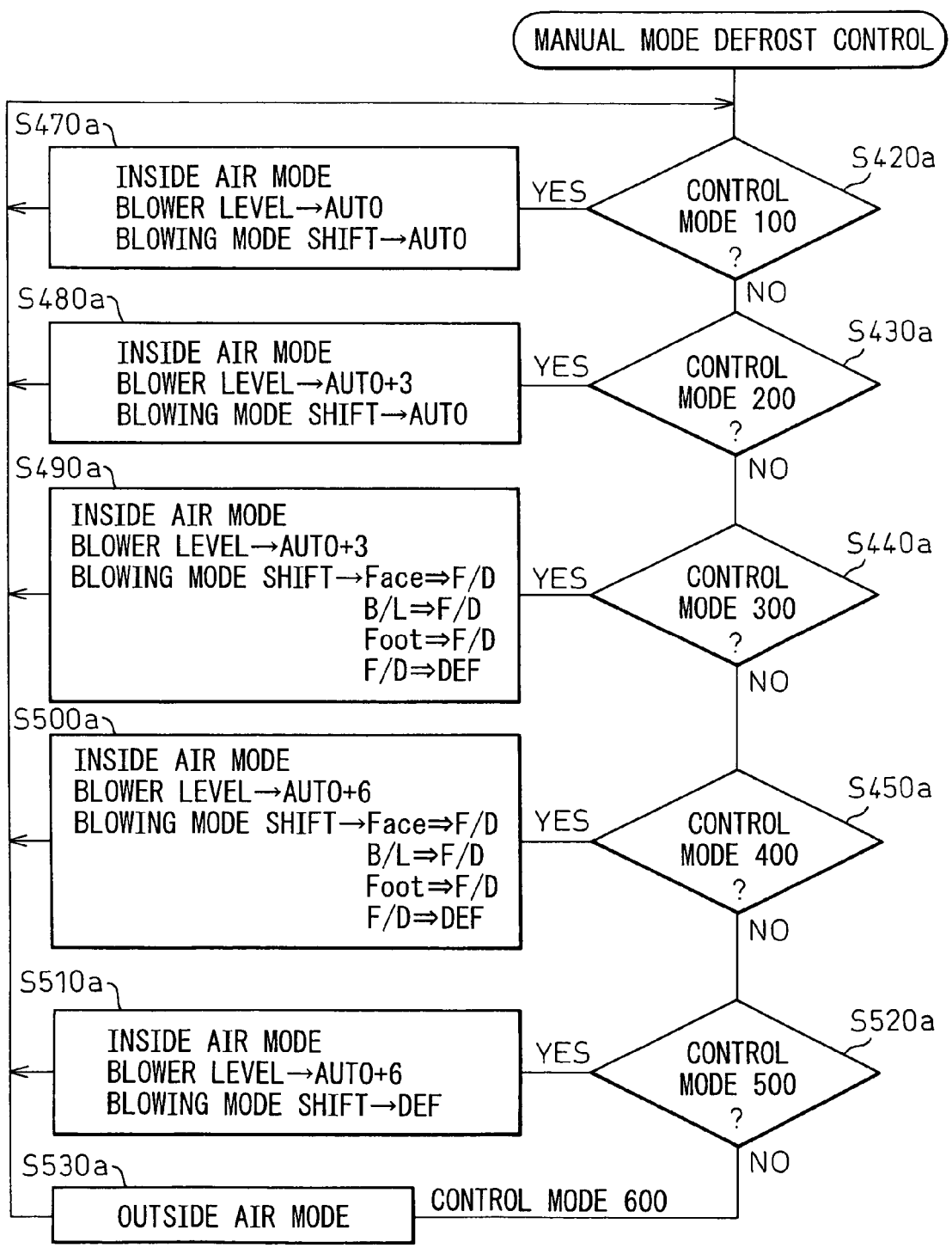
FIG. 13 is a flow chart showing the defrost control logic according to the first embodiment.
Figure 14:
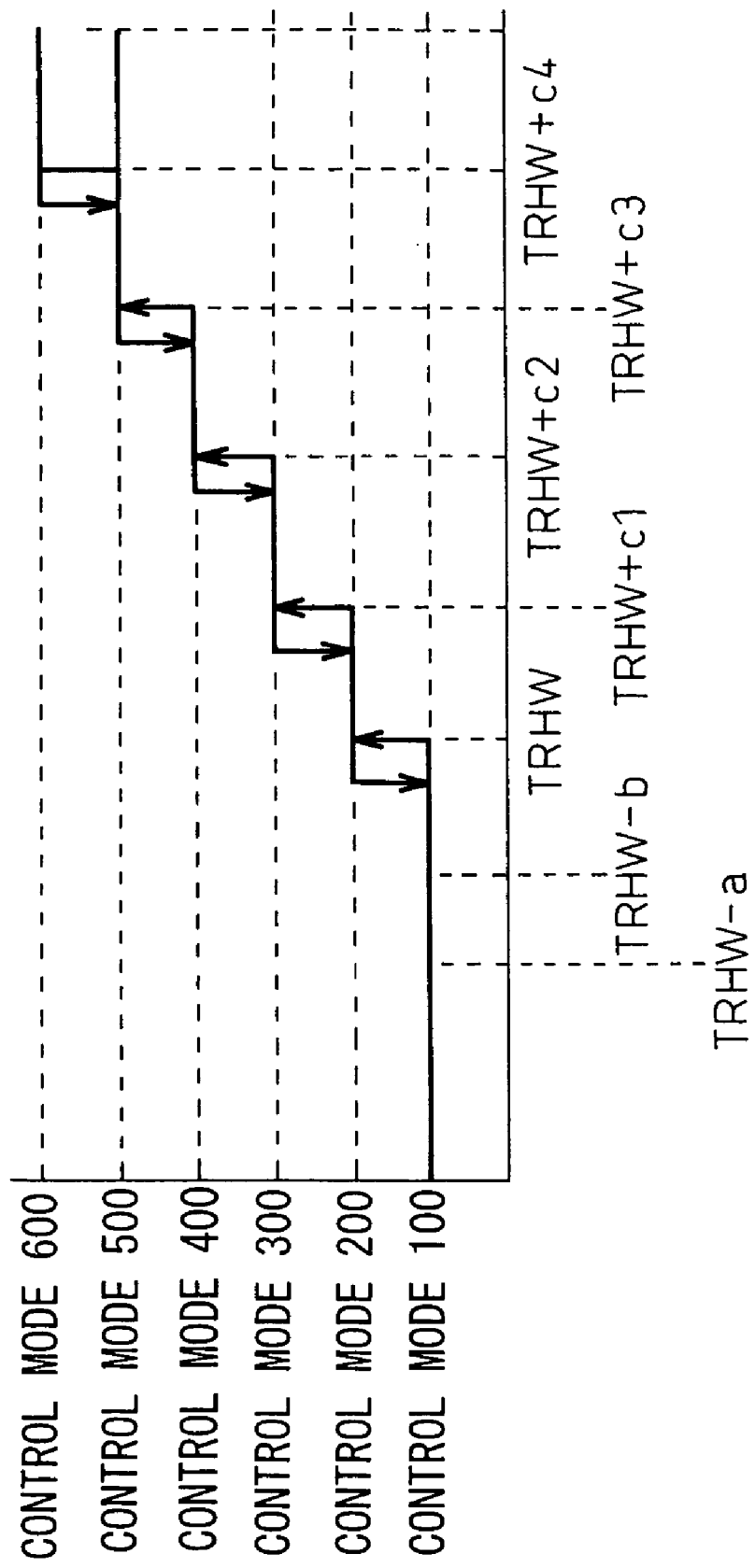
FIG. 14 is a graph showing the relationship between the window glass surface relative humidity and the defrost control mode.

Next, the manual mode defrost control will be explained with reference to FIG. 13 and FIG. 14. FIG. 13 is a flow chart showing a specific example of the manual mode defrost control (S270), while FIG. 14 is a control map for determining the control mode by the manual mode defrost control.

First, at steps S420a, S430a, S440a, S450a, and S520a of FIG. 13, one of the control mode 100 to the control mode 500 is selected based on the window glass surface relative humidity RHW.

Specifically, when the window glass surface relative humidity RHW is lower than the first target window glass surface relative humidity TRHW, YES is judged at S420a and the control mode 100 is selected and executed at S470a. Note that the control processing of the control mode 100 will be explained later.

When the window glass surface relative humidity RHW is higher than the first target window glass surface relative humidity TRHW and lower than the fifth target window glass surface relative humidity (TRHW+c1), YES is judged at S430a and the control mode 200 is selected and executed at S480. Note that c1 in FIG. 14 is a value the same as c1 in FIG. 12. Further, the control processing of the control mode 200 will be explained later.

When the window glass surface relative humidity RHW is higher than the third target window glass surface relative humidity (TRHW+c2) and lower than the fifth target window glass surface relative humidity (TRHW+c1), YES is judged at S440a and the control mode 300 is selected and executed at S490a. Note that c2 in FIG. 14 is a value the same as c2 in FIG. 12. Further, the control processing of the control mode 300 will be explained later.

When the window glass surface relative humidity RHW is higher than the sixth target window glass surface relative humidity (TRHW+c3) and lower than the third target window glass surface relative humidity (TRHW+c2), YES is judged at S520a and the control mode 400 is selected and executed at S500a. Note that c3 in FIG. 14 is a value the same as c3 in FIG. 12. Further, the control processing of the control mode 400 will be explained later.

When the window glass surface relative humidity RHW is higher than the sixth target window glass surface relative humidity (TRHW+c3) and lower than the seventh target window glass surface relative humidity (TRHW+c4), YES is judged at S520a and the control mode 500 is selected and executed at S510a. Note that c3 in FIG. 14 is a value the same as c3 in FIG. 12. For example, 25% is used. Further, the control processing of the control mode 500 will be explained later.

When the window glass surface relative humidity RHW is higher than the seventh target window glass surface relative humidity (TRHW+c4), NO is judged at S520a and the control mode 600 is selected and executed at S530a. Further, the control processing of the control mode 600 will be explained later.

As explained above, the lower the window glass surface relative humidity RHW, the further the control mode is stepwisely switched in the order of the control mode 600→control mode 500→control mode 400→control mode 300→control mode 200→control mode 100. In the control modes 600 to 100, the defrost effect becomes higher in the order of the control mode 100→200→ . . . 500→600.

Next, the specific control processing of the control modes 100 to 600 will be explained.

Control Mode 100

In the control mode 100, the inside/outside air intake mode is set to the inside air mode. The blower level is set to the above auto blower level and the blowing mode is set by the automatic blowing control (indicated as "AUTO" in FIG. 13) in the same way as the above S460.

Control Mode 200

In the control mode 200, the inside/outside air intake mode is set to the inside air mode. The blower level is set to air flow rate of the above auto blower level plus 3 levels. The blowing mode is set by the automatic blowing control (indicated as "AUTO" in FIG. 13) in the same way as the above S460.

Control Mode 300

In the control mode 300, the inside/outside air intake mode is set to the inside air mode. The blower level is set to the air flow rate of the above auto blower level plus 3 levels. The blowing mode is changed by the blowing mode of the previous control mode in the same way as the above control mode 40 and set to the foot/defrost mode or the defrost mode.

Control Mode 400

In the control mode 400, the inside/outside air intake mode is set to the inside air mode. The blower level is set to the air flow rate of the above auto blower level plus 6 levels. The blowing mode is changed by the blowing mode of the previous control mode in the same way as the above control mode 40 and set to the foot/defrost mode or the defrost mode.

Control Mode 500

In the control mode 500, the inside/outside air intake mode is set to the inside/outside air mode and the blower level is set to the air flow rate of the above auto blower level plus 6 levels. The blowing mode is set to the defrost mode.

Control Mode 600

In the control mode 600, the outside air mode is forcibly switched to.

As explained above, according to the present embodiment, an indoor air-conditioning unit 30 introducing at least one of inside air and outside air, adjusting the state of the introduced air, and blowing the air into the vehicle compartment and a processing circuit 20d estimating the degree of ease of fogging near the window glass in the vehicle compartment (that is, the window glass surface relative humidity) are provided. The air-conditioning electronic control device 26 calculates the inside air instruction value S in accordance with the degree of ease of fogging and judges whether the window glass is liable to fog up based on the inside air instruction value S. Further, when the inside air instruction value S=0, the window glass is judged liable to fog, then at step S260, the indoor air-conditioning unit 30 is controlled to prevent the window glass from fogging up in defrost control. When the inside air instruction value S is not 0, the window glass is judged resistant to fogging and defrost control is not performed. At step S250, the indoor air-conditioning unit 30 is controlled to introduce at least inside air into the vehicle compartment.

Here, according to the present embodiment, if setting the inside air mode and introducing inside air into the vehicle compartment, compared with the outside air mode of introducing only outside air, the temperature of the introduced air can be raised, so the heating performance can be improved. Further, one of the inside air introduction control means and the defrost control means is switched to and actuated in accordance with the window glass surface relative humidity, so the occurrence of fogging of the window glass can be suppressed and the drop in the heating capability can be suppressed.

Further, according to the present embodiment, one of the control modes 1 to 3 is selected and executed in accordance with the window glass surface relative humidity (that is, the degree of ease of fogging of the window glass), so the ratio of the inside air introduced into the vehicle compartment can be controlled extremely finely in accordance with the degree of ease of fogging of the window glass.

Second Embodiment

When the engine water temperature is low at the initial start of a heating operation, the heater core 44 may not sufficiently warm the air-conditioning air, cool air may be blown out from the blowing ports 48 to 50, and the passengers may be discomforted as that cool air strikes them.

Figure 15:
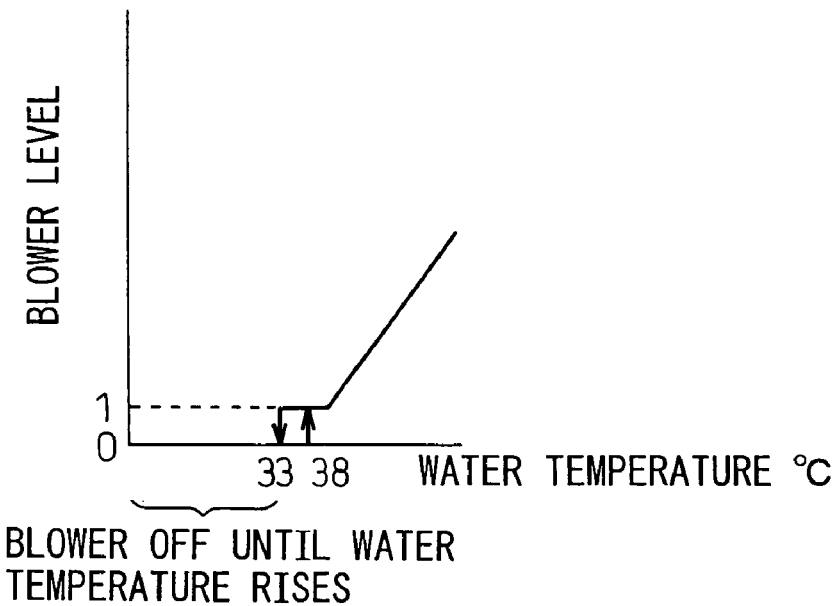
FIG. 15 is graph relating to conventional control for explaining the effects of a second embodiment of the present invention.

Therefore, as shown in FIG. 15, in the related art, when the engine water temperature is low, after the start of a heating operation, the air-conditioning use electrically driven blower 37 is stopped for a certain time until the engine water temperature reaches a certain temperature (33° C.) or more, then the air-conditioning use electrically powered blower 37 is started. By doing this, cool air is prevented from striking the passengers.

Figure 16:
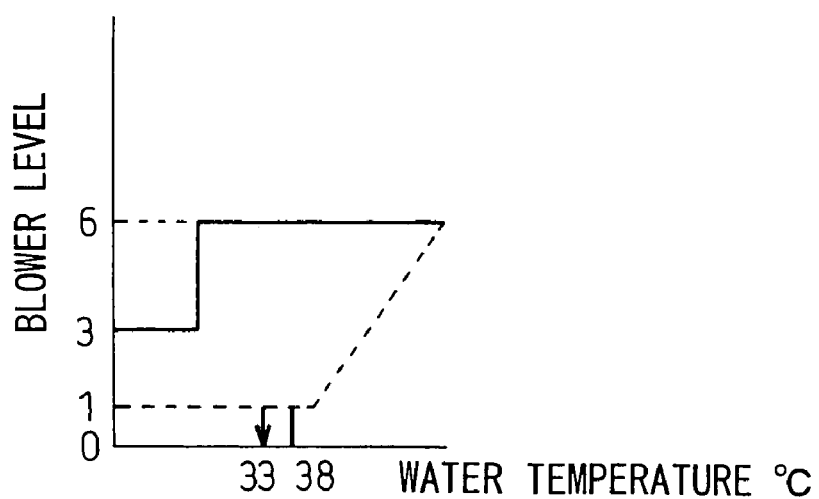
FIG. 16 is a graph relating to conventional defrost control for explaining the effects of the second embodiment.

However, when the air-conditioning use electrically powered blower 37 is stopped, the respiration of the passengers causes the humidity in the vehicle compartment to rise and the window glass ends up fogging up. On the other hand, as shown in FIG. 16, if the heating operation is started to actuate the defrost control, cool air will be blown out at the initial start of the heating operation, so the passengers will be conversely discomforted.

In the above first embodiment, when the window glass surface relative humidity RHW is the third target window glass surface relative humidity (TRHW+c2) or more, the window glass is deemed very liable to fog up, so the control mode 4 (that is, S=0) is selected and defrost control is executed. On the other hand, when the window glass surface relative humidity RHW is less than the third target window glass surface relative humidity (TRHW+c2) (however, only when S is not 0), the control modes 1 to 3 are selected and the inside/outside air intake mode control is executed.

That is, as the lower limit value used for the judgment as to if the window glass is very liable to fog up, the third target window glass surface relative humidity (TRHW+c2) is used.

As opposed to this, in the second embodiment, at the initial start of the heating operation, the lower limit value is set higher than after the initial start of the heating operation. That is, at the initial start of the heating operation, the lower limit value is set higher. When the temperature of the engine cooling water (that is, the water temperature) rises, the lower limit value is restored to its original value. Note that this lower limit value corresponds to the "threshold value" of claim 7.

Figure 17:
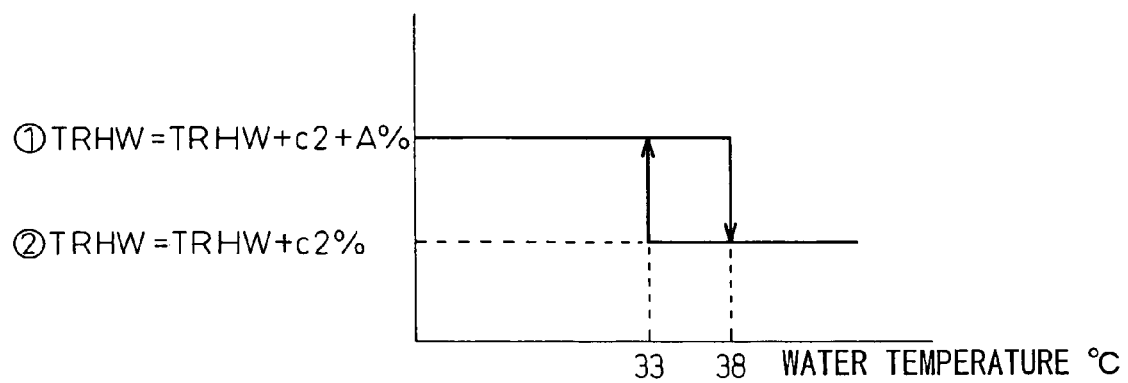
FIG. 17 is a graph for explaining the control according to the second embodiment.

Specifically, as shown in FIG. 17, when the temperature of the engine cooling water is less than 33° C. (corresponding to the predetermined temperature of claim 10), the lower limit value is set higher than the third target window glass surface relative humidity (TRHW+c2) by exactly A (for example, 5%) to obtain the target window glass surface relative humidity (TRHW+c2+A). After this, when the temperature of the engine cooling water rises higher than 38° C., the lower limit value is restored to its original value to obtain the target window glass surface relative humidity (TRHW+c2). At this time, the heater core 44 is enough for temperature adjustment, so the defrost control is performed by the air-conditioning air adjusted in temperature.

Figure 18:
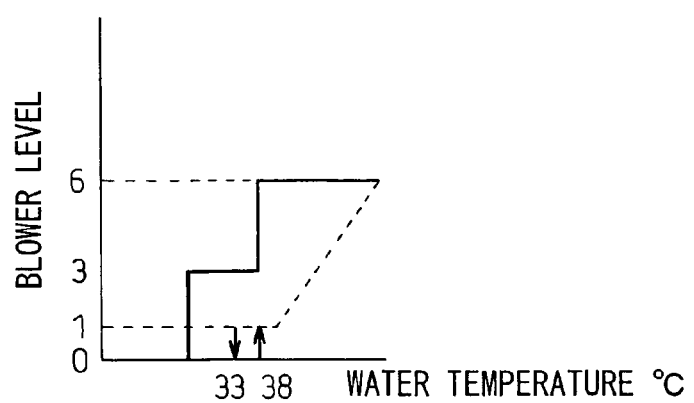
FIG. 18 is a graph for explaining the effects of the control according to the second embodiment.

Therefore, as shown in FIG. 18, at the initial start of a heating operation when the temperature of the engine cooling water is low, the control mode 4 (that is, the defrost control) can be made difficult to select. As a result, the timing of startup of the air-conditioning use electrically powered blower 37 accompanying the defrost control can be delayed. Accordingly, when the temperature of the engine cooling water is less than 38° C., defrost control becomes difficult to actuate and the blower level can be reduced. After this, when the heater core 44 is sufficient for adjusting the air-conditioning air in temperature, the defrost control is started. Therefore, at the initial start of the heating operation, the passengers can be prevented from being discomforted and fogging of the window glass can be eliminated.

Third Embodiment

In the first embodiment, one of the control modes 10 to 60 was selected as the defrost control based on the window glass surface relative humidity RHW and the blowing mode was determined along with this selection, but at the initial start of the heating operation when the engine cooling water is low in temperature, cool air is blown out from the blowing ports. At this time, if cool air is directly blown from the face blowing port 49 and the foot blowing port 50 to the passengers, the passengers will sometimes be discomforted.

Figures 19, 20:
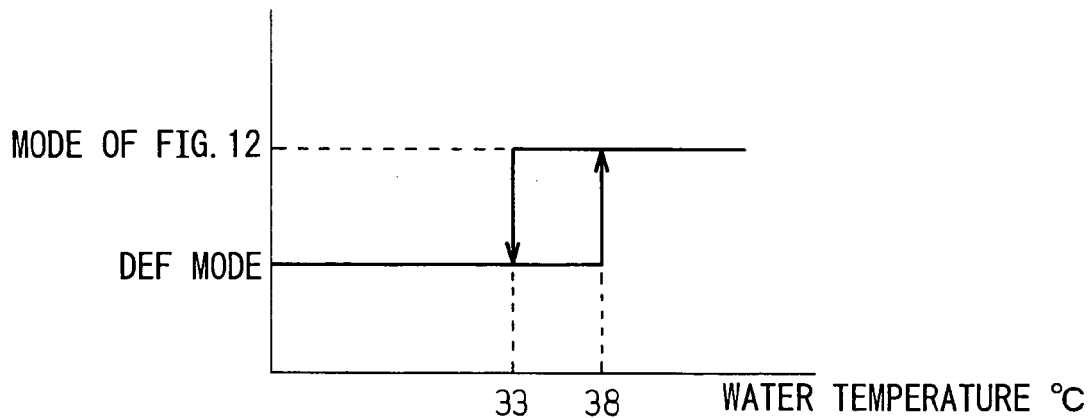
FIG. 19 is a graph for explaining control according to a third embodiment of the present invention.
FIG. 20 is a graph for explaining control according to a fourth embodiment of the present invention.

Therefore, in the third embodiment, as shown in FIG. 19, when the temperature of the engine cooling water is less than 33° C., the defrost mode is selected. After this, when the temperature of the engine cooling water rises and becomes higher than 38° C., one of the control modes 10 to 60 is selected as shown in FIG. 12 based on the window glass surface relative humidity RHW and the blowing mode is selected along with that selection. That is, the blowing ports for blowing out air-conditioning air into the vehicle compartment among the blowing ports 48 to 50 are switched in accordance with the window glass surface relative humidity RHW (degree of ease of fogging of window glass).

Due to the above, at the initial start of the heating operation where the engine cooling water is low in temperature, the defrost mode is selected. Even if cool air is blown out from the blowing port, that cool air can be kept from being blown out directly to the passengers.

Fourth Embodiment

In the fourth embodiment, as shown in FIG. 20, the control modes 10 to 60 of the first embodiment (defrost control of FIG. 11) are augmented by the control modes 70, 80, and 90.

In the fourth embodiment, the procedure for selection of the control modes 10 to 60 is similar to the first embodiment. When the window glass surface relative humidity RHW is higher than the sixth target window glass surface relative humidity (TRHW+c3) and lower than the seventh target window glass surface relative humidity (TRHW+c4), the control mode 70 is selected. The c4 in FIG. 20 is a numerical value larger than c3 (for example, 25%). Further, when the window glass surface relative humidity RHW is higher than the seventh target window glass surface relative humidity (TRHW+c4) and lower than the eighth target window glass surface relative humidity (TRHW+c5), the control mode 80 is selected. The c5 in FIG. 20 is a numerical value larger than c4 (for example, 30%). Further, when the window glass surface relative humidity RHW is higher than the eighth target window glass surface relative humidity (TRHW+c), the control mode 90 is selected.

Therefore, as the window glass surface relative humidity RHW rises, the control mode is switched in the order of the control mode 10→control mode 20→control mode 30→control mode 40→control mode 50→control mode 60→control mode 70→control mode 80→control mode 90.

Here, in the control mode 70, an air flow rate of the above auto blower level plus 9 levels is set, in the control mode 80, an air flow rate of the above auto blower level plus 12 levels is set, and in the control mode 90, an air flow rate of the above auto blower level plus 15 levels is set. Therefore, even when the window glass surface relative humidity RHW becomes higher than the sixth target window glass surface relative humidity (TRHW+c3), the blower level can be raised along with the rise of the window glass surface relative humidity RHW, so fogging can be prevented more effectively. Note that in the control modes 70 to 90, in the same way as S510 in FIG. 11, the inside/outside air intake mode is set to the outside air mode and the blower mode is set to the defrost mode.

Fifth Embodiment

In the first embodiment, the example was explained where, in the control mode 10 of the auto mode defrost control, even when the window glass surface relative humidity RHW was less than the first target window glass surface relative humidity TRHW, one of the control modes 10 and 20 was selected in accordance with the window glass surface relative humidity RHW, but instead of this, in the fifth embodiment, when the window glass surface relative humidity RHW is less than the first target window glass surface relative humidity TRHW, the same control mode is set.

Figure 21:
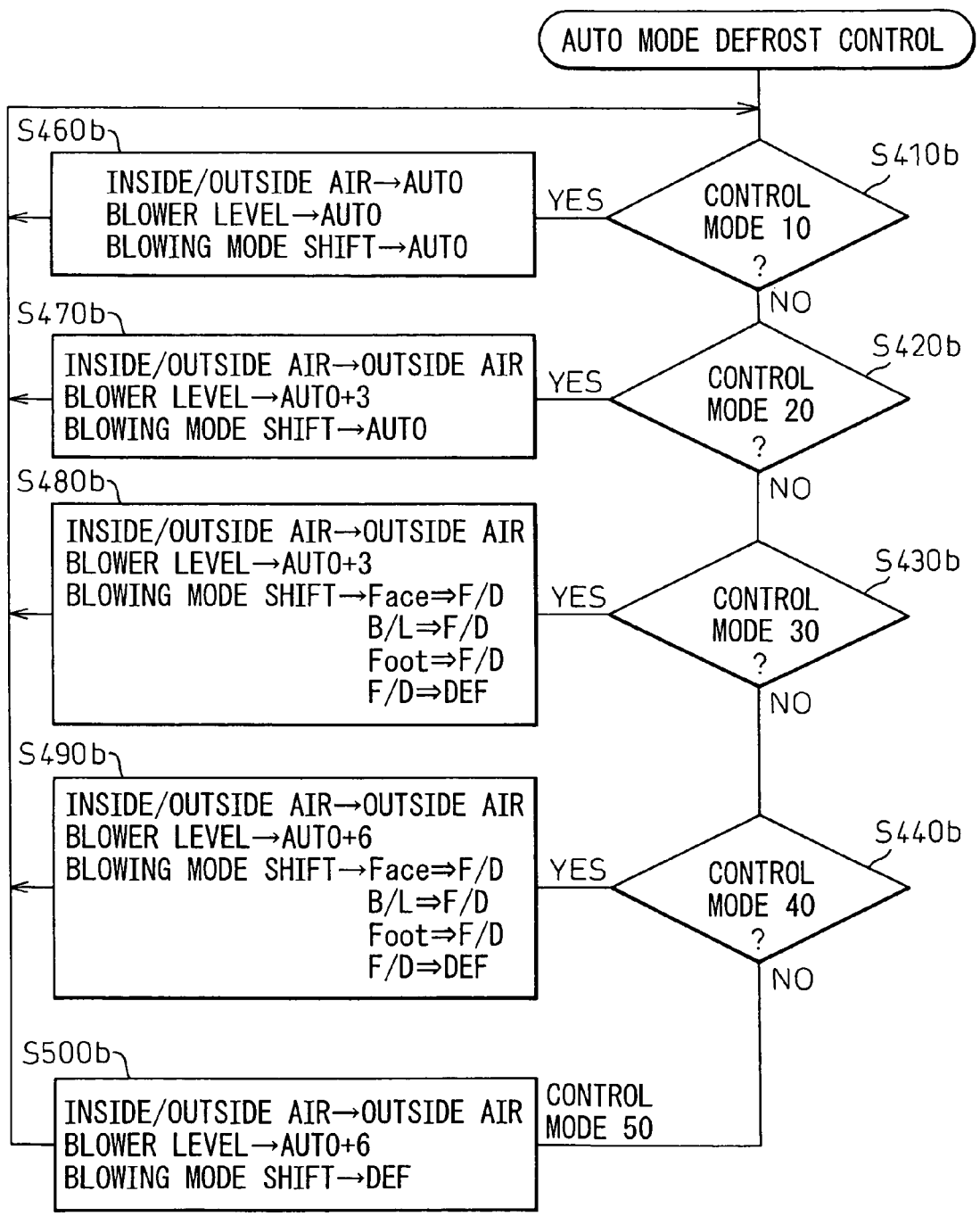
FIG. 21 is a flow chart showing the basic logic of air-conditioner control according to a fifth embodiment of the present invention.
Figure 22:
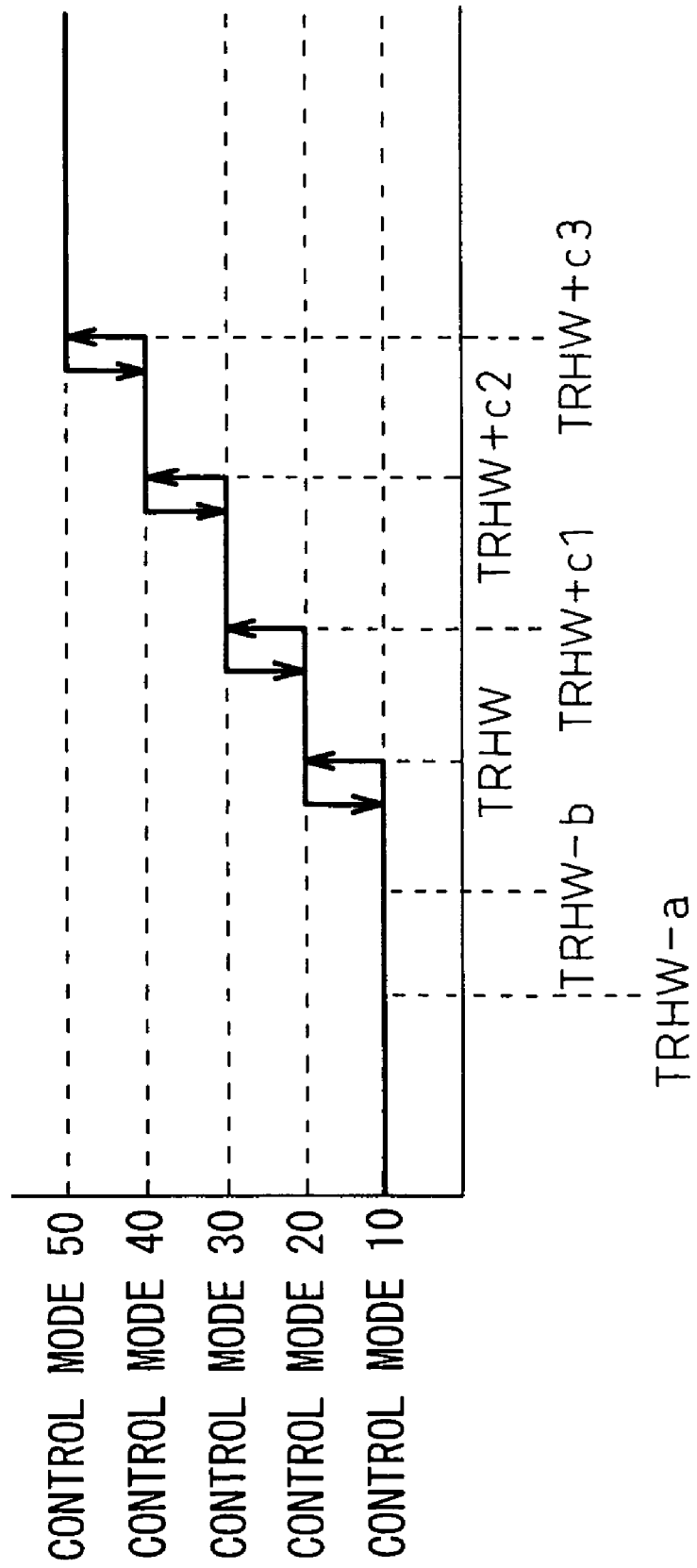
FIG. 22 is a graph for explaining control according to the fifth embodiment.

Below, the auto mode defrost control of the present embodiment will be explained. FIG. 21 is a flow chart showing a specific example of the auto mode defrost control, while FIG. 22 is a control map for selecting the control mode in the auto mode defrost control.

First, at steps S410a to S450a of FIG. 21, one of the control modes 10 to 50 is selected based on the window glass surface relative humidity RHW.

Specifically, when the window glass surface relative humidity RHW is lower than the first target window glass surface relative humidity TRHW, YES is judged at S410b and the control mode 10 is selected and executed at S460b. Note that the control processing of the control mode 10 will be explained later.

When the window glass surface relative humidity RHW is lower than the fifth target window glass surface relative humidity (TRHW+c1) and higher than the first target window glass surface relative humidity TRHW, YES is judged at S420b and the control mode 20 is selected and executed at S470b. Note that c2 in FIG. 22 is a value the same as c2 in FIG. 10. Further, the control processing of the control mode 20 will be explained later.

When the window glass surface relative humidity RHW is lower than the third target window glass surface relative humidity (TRHW+c2) and higher than the fifth target window glass surface relative humidity (TRHW+c1), YES is judged at S430b and the control mode 30 is selected and executed at S480b. Note that c1 in FIG. 22 is a value the same as c1 in FIG. 10. Further, the control processing of the control mode 30 will be explained later.

When the window glass surface relative humidity RHW is lower than the sixth target window glass surface relative humidity (TRHW+c3) and higher than the third target window glass surface relative humidity (TRHW+c2), YES is judged at S440b and the control mode 40 is selected and executed at S490b. Note that c3 in FIG. 22 is a value the same as c3 in FIG. 12. Further, the control processing of the control mode 40 will be explained later.

When the window glass surface relative humidity RHW is higher than the sixth target window glass surface relative humidity (TRHW+c3), NO is judged at S440b and the control mode 50 is selected and executed at S500b. Further, the control processing of the control mode 60 will be explained later.

In this way, the lower the window glass surface relative humidity RHW, the further the control mode is switched to in the order of the control mode 50→control mode 40→control mode 30→control mode 20-control mode 10.

Next, the specific control processings of the control modes 10 to 60 will be explained.

Control Mode 10

In the control mode 10, to blow lower humidity air to the surface of the window glass, the inside/outside air intake mode is set to the outside air mode. Further, the blower level is set to the above auto blower level. Further, the blowing mode is set by the automatic blowing control based on the target blowing temperature TAO (indicated as "AUTO" in FIG. 21).

Control Mode 20

This control mode 20 blows lower humidity air to the surface of the window glass and raises the blower level in a range not discomforting the passengers by, in the same way as S480 in FIG. 11 (control mode 30), switching the inside/outside air intake mode from the inside/outside air mode to the outside air mode, setting the blower level to the air flow rate of the above auto blower level plus 3 levels, and setting the blowing mode by the automatic blowing control in the same way as the control mode 10 (indicated by "AUTO" in FIG. 21).

Control Mode 30

The control mode 309 forcibly eliminates fogging of the window glass in the same way as S490 in FIG. 11 (control mode 40) by switching the inside/outside air intake mode from the inside/outside air mode to the outside air mode and setting the blower level to an air flow rate of the above auto blower level plus 3 levels. Further, the blowing mode is set to the defrost mode or the foot/defrost mode by the blowing mode of the previous control mode.

Control Mode 40

In the control mode 40, fogging of the window glass is forcibly eliminated in the same way as S500 in FIG. 11 (control mode 50) by switching the inside/outside air intake mode from the inside/outside air mode to the outside air mode and setting the blower level to an air flow rate of the above auto blower level plus 6 levels. Further, the blowing mode is set to the foot/defrost mode or the defrost mode by the blowing mode of the previous control mode.

Control Mode 50

In the control mode 50, fogging of the window glass is forcibly eliminated in the same way as S510 in FIG. 11 (control mode 60) by setting the inside/outside air intake mode to the outside air mode and setting the blower level to an air flow rate of the above auto blower level plus 6 levels. Further, the blowing mode is set to the defrost mode.

Other Embodiments

In the above first embodiment, an example of use of the window glass surface relative humidity as the "degree of ease of fogging" was explained, but the invention is not limited to this. For example, the temperature difference between the condensation point temperature of the window glass and the surface temperature of the window glass may also be used as the "degree of ease of fogging".

In the above first embodiment, an example of computing the window glass surface relative humidity RHW based on the relative humidity RH in the vehicle compartment, the air temperature, and the window glass temperature was explained, but the invention is not limited to this. It is also possible to directly detect the humidity and temperature of the window glass surface to compute the window glass surface relative humidity RHW.

Further, the invention is not limited to the case of directly detecting the glass temperature from the window glass. It is also possible to estimate the temperature of the window glass from the vehicle compartment inside temperature, outside air temperature, amount of sunlight, vehicle speed, etc.

Explaining the correspondence between the embodiments and the claims, the inside air-conditioning unit 30 corresponds to the air-conditioning means, the processings of S240 correspond to the judging means, the control processing of step S260 corresponds to the defrost control means, the control processing of step S250 corresponds to the inside air introduction control means, the humidity sensor 17 corresponds to the humidity detecting means, the inside air instruction value corresponds to the inside/outside air control instruction value S, the detection device 10 corresponds to the calculating means, and the defroster blowing port 48, face blowing port 49, and foot blowing port 50 correspond to the plurality of blowing ports.

While the invention has been described with reference to specific embodiments chosen for purpose of illustration, it should be apparent that numerous modifications could be made thereto by those skilled in the art without departing from the basic concept and scope of the invention.

The invention claimed is:

1. A vehicle air-conditioner provided with means for conditioning air, the conditioning means including means for introducing at least one of inside air and outside air, means for adjusting the state of the introduced air, and means for blowing the air out into a vehicle compartment, the vehicle air-conditioner further provided with:

an inside air introduction port introducing the inside air,
an outside air introduction port introducing the outside air,
at least one door for controlling an opening degree of the inside air introduction port and the outside air introduction port,
means for detecting a humidity inside the vehicle compartment,
means for judging whether window glass of said vehicle compartment is liable to fog up in accordance with the humidity detected by said detecting means,
first means for controlling said conditioning means to prevent said window glass from fogging up as defrost control when the window glass inside said vehicle compartment is judged liable to fog up by said judging means and not performing said defrost control when the window glass in said vehicle compartment is judged resistant to fogging by said judging means, and second means for controlling said conditioning means to control an open position of said at least one door so as to increase a ratio of said inside air introduced into the vehicle compartment when the vehicle compartment is heated under heating control by said conditioning means and the window glass inside the vehicle compartment is judged resistant to fogging by said judging means.

2. A vehicle air-conditioner as set forth in claim 1, wherein said vehicle air-conditioner is further provided with means for calculating the degree of ease of fogging of said window glass based on the humidity detected by the detecting means and
said judging means judges whether said window glass in the vehicle compartment is liable to fog up based on the degree of ease of fogging of said window glass.

3. A vehicle air-conditioner as set forth in claim 2, wherein said calculating means finds a relative humidity near the inside surface of the window glass as the degree of ease of fogging of the window glass.

4. A vehicle air-conditioner as set forth in claim 2, wherein the vehicle air-conditioner is further provided with means for calculating an inside air instruction value for determining a ratio of said inside air and said outside air which said conditioning means introduces into said vehicle compartment based on the degree of ease of fogging of said window glass, and
said judging means judges if the window glass in said vehicle compartment is liable to fog up in accordance with said inside air instruction value.

5. A vehicle air-conditioner as set forth in claim 4, wherein said judging means judge that the window glass in said vehicle compartment is liable to fog up when an inside air instruction value for introducing only outside air into said vehicle compartment is calculated by said means for calculating the inside air instruction value and
said judging means judges that the window glass in said vehicle compartment is resistant to fogging when an inside air instruction value for introducing inside air and outside air into said vehicle compartment is calculated by said means for calculating the inside air value.

6. A vehicle air-conditioner as set forth in claim 4, wherein the vehicle air-conditioner has a first control mode which stepwisely increases the ratio of inside air introduced into the vehicle compartment, a second control mode which maintains the ratio of said inside air and outside air introduced into said vehicle compartment, and a third control mode which stepwisely increases the ratio of the outside air introduced into said vehicle compartment, and
said means for calculating the inside air value selects one of said first to third control modes in accordance with the degree of ease of fogging of said window glass.

7. A vehicle air-conditioner as set forth in claim 6, wherein the vehicle air-conditioner further has a fourth control mode which introduces just outside air into said vehicle compartment,
said means for calculating the inside air value selects one of said first to third control modes when the degree of ease of said window glass is less than a threshold value and select said fourth control mode when the degree of ease of fogging of said window glass is the threshold value or more,
said conditioning means has a heating heat exchanger for adjusting the temperature of the air blown into the vehicle compartment by the engine cooling water, and
said threshold value used when the water temperature of said engine cooling water is less than a predetermined temperature is set higher than said threshold value used when the water temperature of said engine cooling water is the predetermined temperature or more.

8. A vehicle air-conditioner as set forth in claim 1, wherein said conditioning means has a plurality of blowing ports, for blowing air into the vehicle compartment, and
said first means for controlling said conditioning means switches the blowing ports blowing air into said vehicle compartment among said plurality of blowing ports so as to prevent fogging of said window glass.

9. A vehicle air-conditioner as set forth in claim 8, wherein said conditioning means has a heating heat exchanger for adjusting the temperature of the air blown into the vehicle compartment by engine cooling water,
said conditioning means switches the blowing ports for blowing air into said vehicle compartment among said plurality of blowing ports in accordance with the degree of ease of fogging of said window glass when a temperature of said engine cooling water is a predetermined temperature or more, and
said conditioning means sets a defrost mode which blows air toward the inside surface of said window glass when the temperature of said engine cooling water is less than the predetermined temperature.

10. A vehicle air-conditioner as set forth in claim 8, wherein said conditioning means increases the amount of air blown out from said blowing ports along with a rise in the degree of ease of fogging of the window glass.

11. A vehicle air-conditioner as set forth in claim 1, wherein when a mode for introducing only inside air into the vehicle compartment is manually set, said first means for controlling said conditioning means actuates said defrost control regardless of a degree of ease of fogging of the window glass.

12. A vehicle air-conditioner as set forth in claim 11, wherein when the mode for introducing only inside air into the vehicle compartment is manually set, if the degree of ease of fogging of the window glass is less than a predetermined value, said defrost control is performed for preventing the window glass from fogging while introducing the inside air, while if the degree of ease of fogging of said window glass is the predetermined value or more, said defrost control is performed for preventing the window glass from fogging by switching the introduced air from inside air to outside air.

13. A vehicle air-conditioner as set forth in claim 1, wherein said first means for controlling said conditioning means introduces only outside air so as to prevent said window glass from fogging when performing said defrost control.

14. A vehicle air-conditioner comprising:
means for introducing at least one of inside air and outside air into the vehicle air-conditioner,
an inside air introduction port introducing the inside air,
an outside air introduction port introducing the outside air,
at least one door for controlling an opening degree of the inside air introduction port and the outside air introduction port,
means for adjusting the state of the introduced air,
means for blowing the introduced air out into a vehicle compartment,
means for detecting humidity inside the vehicle compartment,
means for judging whether a window glass of said vehicle compartment is liable to fog up or is resistant to fogging up in accordance with the humidity detected by said detecting means, means for controlling said vehicle air-conditioner to prevent said window glass from fogging up when the window glass inside said vehicle compartment is judged liable to fog up by said judging means, and means for controlling said vehicle air-conditioner to control an open position of said at least one door so as to increase a ratio of said inside air introduced into the vehicle air-conditioner when the vehicle compartment is heated under heating control by said conditioning means and the window glass inside the vehicle compartment is judged resistant to fogging by said judging means.

15. A vehicle air-conditioner as set forth in claim 1, wherein the vehicle air-conditioner has a first control mode which stepwisely increases the ratio of inside air introduced into the vehicle compartment, a second control mode which maintains the ratio of said inside air and outside air introduced into said vehicle compartment, and a third control mode which stepwisely increases the ratio of the outside air introduced into said vehicle compartment, the vehicle air-conditioner is further provided with means for calculating an inside air instruction value for determining a ratio of said inside air and said outside air which said conditioning means introduces into said vehicle compartment based on the degree of ease of fogging of said window glass, and said means for calculating an inside air instruction value selects one of said first to third control modes in accordance with the degree of ease of fogging of said window glass.

16. A vehicle air-conditioner as set froth in claim 15, wherein the vehicle air-conditioner further has a fourth control mode which introduces just outside air into said vehicle compartment, said means for calculating an inside air instruction value selects one of said first to third control modes when the degree of ease of said window glass is less than a threshold value and select said fourth control mode when the degree of ease of fogging of said window glass is the threshold value or more, said conditioning means has a heating heat exchanger for adjusting the temperature of the air blown into the vehicle compartment by the engine cooling water, and said threshold value used when the water temperature of said engine cooling water is less than a predetermined temperature is set higher than said threshold value used when the water temperature of said engine cooling water is the predetermined temperature or more.

* * * * *